(12) United States Patent
Maegawa

(10) Patent No.: US 7,474,603 B2
(45) Date of Patent: Jan. 6, 2009

(54) OPTICAL INFORMATION RECORDING METHOD, APPARATUS, AND MEDIUM, LASER CONTROL CIRCUIT, WOBBLE SIGNAL DETECTION METHOD, AND SERVO SIGNAL DETECTION METHOD

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 456 days.

(21) Appl. No.: 10/650,814

(22) Filed: Aug. 29, 2003

(65) Prior Publication Data

US 2004/0052177 A1 Mar. 18, 2004

(30) Foreign Application Priority Data

Sep. 4, 2002 (JP) ............... 2002-259179
Nov. 29, 2002 (JP) ............... 2002-346800
Nov. 29, 2002 (JP) ............... 2002-346820

(51) Int. Cl.
*G11B 7/00* (2006.01)
(52) U.S. Cl. ............... 369/116; 369/47.51; 369/59.11
(58) Field of Classification Search ............... None
See application file for complete search history.

(56) References Cited

U.S. PATENT DOCUMENTS

| | | | |
|---|---|---|---|
| 5,438,601 A | 8/1995 | Maegawa et al. | |
| 5,602,823 A | 2/1997 | Aoki et al. | |
| 5,648,952 A | 7/1997 | Maegawa et al. | |
| 5,732,062 A * | 3/1998 | Yokoi et al. | 369/116 |
| 5,745,463 A | 4/1998 | Maegawa et al. | |
| 5,745,467 A * | 4/1998 | Sakaue et al. | 369/59.11 |
| 5,828,634 A | 10/1998 | Ohno et al. | |
| 5,956,313 A | 9/1999 | Maegawa et al. | |
| 6,160,773 A | 12/2000 | Maegawa et al. | |
| 6,160,784 A * | 12/2000 | Maeda et al. | 369/116 |
| 6,345,018 B1 | 2/2002 | Maegawa et al. | |
| 6,411,579 B2 * | 6/2002 | Nobukuni et al. | 369/59.12 |
| 6,714,230 B2 | 3/2004 | Shimizu | |
| 6,982,939 B2 * | 1/2006 | Powelson et al. | 369/47.53 |
| 2001/0005354 A1 | 6/2001 | Maegawa | |

(Continued)

FOREIGN PATENT DOCUMENTS

EP 0 978 827 A2 2/2000

(Continued)

*Primary Examiner*—Joseph Feild
*Assistant Examiner*—Tawfik Goma
(74) *Attorney, Agent, or Firm*—Dickstein Shapiro LLP

(57) ABSTRACT

A multilevel information recording apparatus is disclosed, which includes a control unit that inputs signals to a strategy generating unit and a laser drive unit based on the multilevel information being recorded, a signal indicating the playback and recording state, and a clock signal indicating the cell frequency that is in synch with the multilevel information. The strategy generating unit generates a pulse signal in accordance with the timing of the laser beam emission of a write pulse, an off pulse, a bias pulse, and a space pulse based on the signal from the control unit and the clock signal. The laser drive unit determines the driving current of a laser light source based on a delayed playback signal/delayed recording signal that is obtained by delaying the playback signal/recording signal for a processing time of the strategy generating unit, a pulse signal from the strategy generating unit indicating the emission timing of the pulses, and an intensity signal predetermined for each pulse.

1 Claim, 22 Drawing Sheets

U.S. PATENT DOCUMENTS

| | | |
|---|---|---|
| 2001/0026512 A1 | 10/2001 | Nishimura et al. |
| 2001/0053115 A1 | 12/2001 | Nobukuni et al. |
| 2002/0021643 A1 | 2/2002 | Miura et al. |
| 2002/0136126 A1 | 9/2002 | Maegawa |
| 2002/0141316 A1 | 10/2002 | Tsukamoto |
| 2003/0031108 A1 | 2/2003 | Furumiya et al. |
| 2003/0128641 A1 | 7/2003 | Maegawa et al. |

FOREIGN PATENT DOCUMENTS

| | | |
|---|---|---|
| EP | 1 056 077 A2 | 11/2000 |
| EP | 1 128 365 A1 | 8/2001 |
| JP | 11-345428 A | 12/1999 |
| JP | 2001-84592 | 3/2001 |
| JP | 2002-237040 | 8/2002 |
| WO | WO 01/18797 A1 | 3/2001 |
| WO | WO 01/78072 A1 | 10/2001 |

\* cited by examiner

FIG.3A IMAGINARY CELL
FIG.3B RECORDING MARK
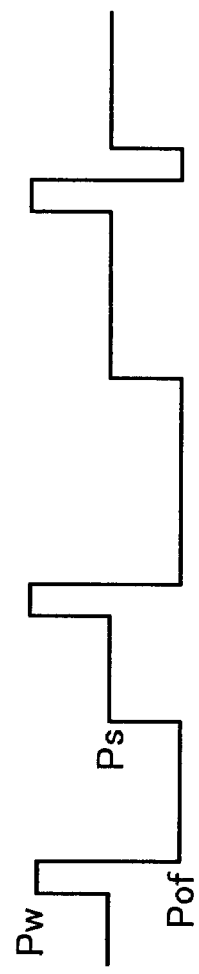
FIG.3C LASER EMISSION WAVEFORM
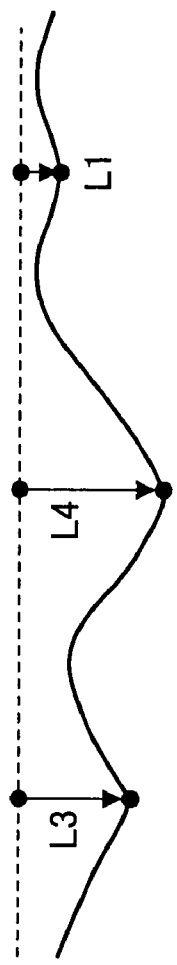
FIG.3D PLAYBACK SIGNAL

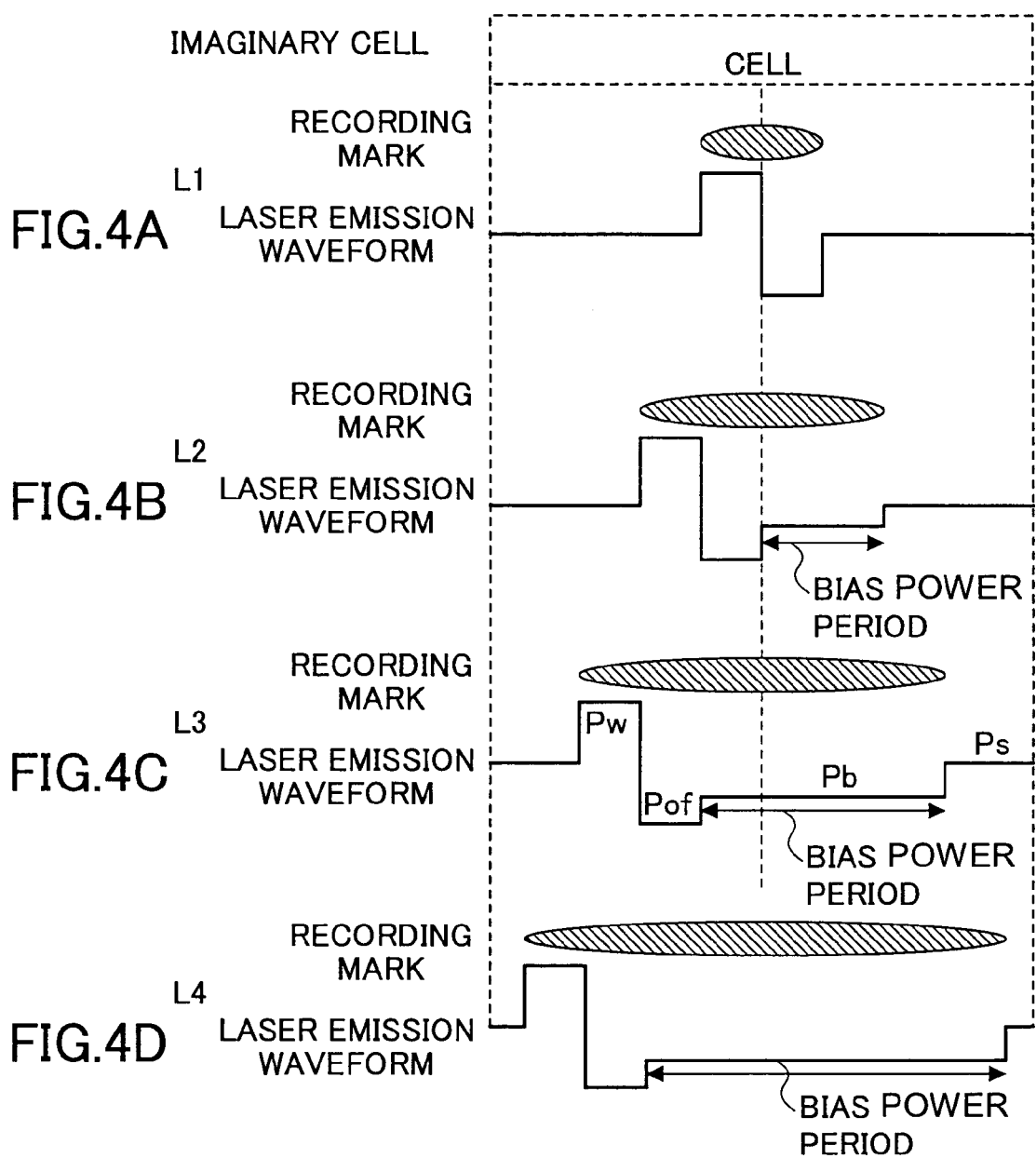

FIG.5A CELL CLOCK SIGNAL 
FIG.5B n-MULTIPLIED CLOCK SIGNAL 
FIG.5C LASER EMISSION WAVEFORM 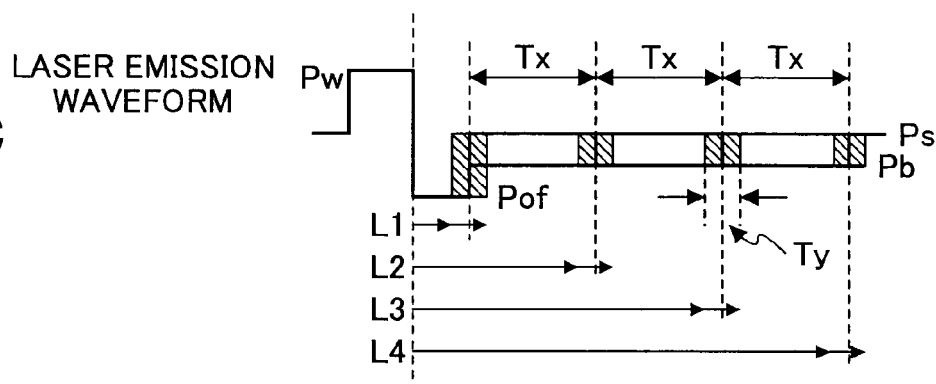

FIG.7A IMAGINARY CELL
FIG.7B RECORDING MARK
FIG.7C PLAYBACK/RECORD
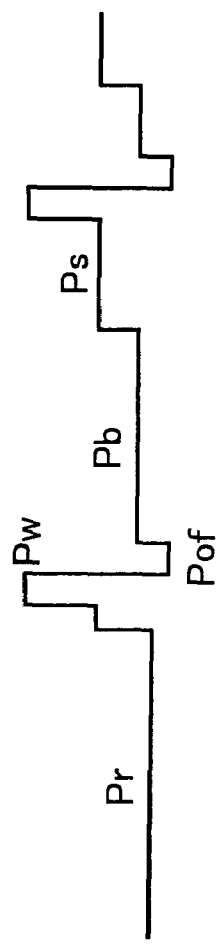
FIG.7D LASER EMISSION WAVEFORM
FIG.7E HFM

| PRECEDING CELL | CURRENT CELL | SUBSEQUENT CELL | | | | |
|---|---|---|---|---|---|---|
| | | 0 | 1 | 2 | 3 | 4 |
| 0 | 0 | T000 | T001 | T002 | T003 | T004 |
| | 1 | T010 | T011 | T012 | T013 | T014 |
| | 2 | T020 | T021 | T022 | T023 | T024 |
| | 3 | T030 | T031 | T032 | T033 | T034 |
| | 4 | T040 | T041 | T042 | T043 | T044 |
| 1 | 0 | T100 | T101 | T102 | T103 | T104 |
| | 1 | T110 | T111 | T112 | T113 | T114 |
| | 2 | T120 | T121 | T122 | T123 | T124 |
| | 3 | T130 | T131 | T132 | T133 | T134 |
| | 4 | T140 | T141 | T142 | T143 | T144 |
| ... | ... | ... | ... | ... | ... | ... |

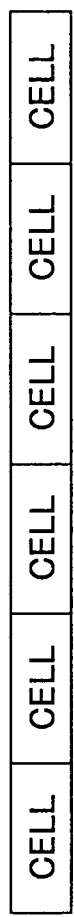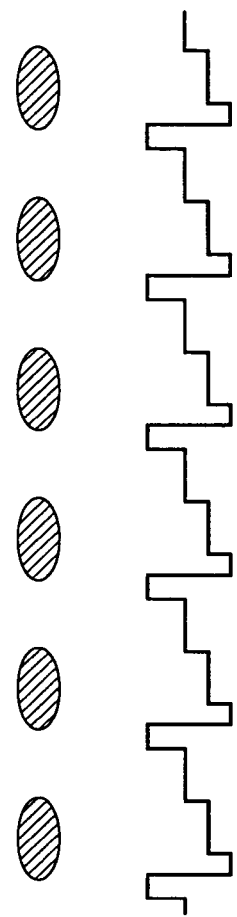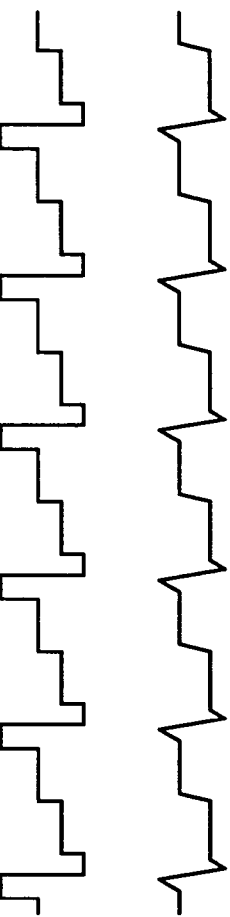
FIG.11A   IMAGINARY CELL
FIG.11B   RECORDING MARK
FIG.11C   LASER EMISSION WAVEFORM
FIG.11D   REFLECTION SIGNAL DURING RECORDING

OPTICAL INFORMATION RECORDING METHOD, APPARATUS, AND MEDIUM, LASER CONTROL CIRCUIT, WOBBLE SIGNAL DETECTION METHOD, AND SERVO SIGNAL DETECTION METHOD

BACKGROUND OF THE INVENTION

1. Field of the Invention

The present invention relates to an optical information recording method for recording multilevel information on an optical information recording medium such as an optical disk, an optical information recording apparatus such as an optical disk apparatus that implements this optical information recording method, a laser control circuit that controls the irradiation of a laser beam, a wobble signal detection method for detecting a wobble signal in multilevel recording, and a servo signal detection method for detecting a servo signal in multilevel recording.

2. Description of the Related Art

These days, CD drives and DVD drives are gaining recognition as optical information recording apparatuses for recording data on an optical information recording medium such as a CD or a DVD. Also, the data size of files being handled is becoming larger and, consequently, greater capabilities are being demanded in the optical information recording apparatus to achieve a larger capacity in the optical information recording medium.

One way of increasing the capacity of the optical information recording medium is to use a multilevel recording technology (e.g., Japanese Patent Laid-Open Publication No. 2001-84592). According to the multilevel recording technology, cells having a predetermined length in the circumferential direction of an optical disk track are defined as imaginary recording units (cells), and a laser beam is irradiated on the cells so that a mark is recorded on each of the cells. Herein, the circumferential direction length of the cells is generally no more than the optical resolution of the laser beam spot. Information is embedded in an area of the mark recorded on each cell. By distinguishing multiple levels of reflection signals from the cells according to the respective mark areas, multilevel information can be extracted from the cells.

In the conventional CD drive or DVD drive, which uses a bi-level information recording method, information is embedded in a recording mark having a length that is greater than the optical resolution. Thus, according to this method, a limit to reducing the beam spot diameter prevents the realization of a larger capacity in the optical disk. Specifically, the beam spot diameter is physically determined by the wavelength of the laser beam and the numerical aperture (NA) of the lens. Therefore, an attempt at reducing the beam spot diameter has to rely on increasing the wavelength of the laser short wave and increasing the NA of the lens. On the other hand, according to the multilevel information recording method, multilevel information is recorded on cells having lengths that are no more than the optical resolution, and therefore, the capacity of the optical disk can be reduced without relying on reducing the beam spot.

A representative laser emission waveform for multilevel information recording using phase change media includes a write pulse with high light intensity for melting the recording layer of the optical information recording medium, an off pulse with low light intensity for rapidly cooling the recording layer to form a mark, and a space pulse for forming a space on the recording layer (or for erasing an existing mark in the case where re-writing is possible).

In this example, the off power period takes up a large portion of the mark formation time, and light emission is very weak during this period. Namely, the light intensity of the off power period is arranged to be no greater than a playback power. Particularly, the light intensity of the off power period immediately after the write power period is preferably set as low as possible in order to enhance the cooling effect (it is even possible to have no light emission at all). However, when the laser beam output is low, noise is increased due to instability in the light emission state created by influences from the returning (reflected) light. Additionally, the reflection signal intensity is also weakened, resulting in vulnerability to influences from factors such as circuit noise.

Normally, during playback, the playback power has to be set relatively low in order to protect the marks from degradation. Thus, a high frequency modulator (HFM) that can reduce the noise of the laser beam may be used, or the amplification rate of a first stage detection circuit may be increased so that sufficient signal amplitude can be secured and the signal components are not confused with circuit noise, for example.

On the other hand, during recording, the amplification rate of the first stage detection circuit has to be decreased in order to prevent saturation of the signals during the write power period or the space power period in which the light intensities are high so that the signals can be accurately detected. Further, the high frequency modulator is normally turned off during recording and, thus, the signal components obtained during the off power period (weak light emission period) are likely to be confused with noise of the laser beam and circuit noise so that most signal components cannot be detected during this period. Additionally, since the write pulse period is very short, stable signal detection cannot be performed during this period.

However, even during recording, there are signals such as a servo signal and a wobble signal that need to be detected. The servo signal indicates position information for guiding the beam spot to follow a desired track, and the wobble signal indicates information embedded in the recording medium such as address information and rotation information.

In recording multilevel information using a conventional optical information recording apparatus, signal detection is possible when the laser emission waveform corresponds to the space power period in which a sufficient amount of light can be secured at a stable rate; however, during the write power period and the off power period accurate signal detection is impossible for the reasons explained above. Further, since a mark and a space are generated at the same probability, an effective time period for the signal detection is about half the recording time. Consequently, this may lead to degradation in the detected signal quality.

Also, it is noted that in multilevel recording, the recording waveform and its timing are different from those used in the bi-level recording and, therefore, the conventional laser control circuit (LSI: large-scale integration) cannot be used. In bi-level recording, information is represented by the length of the mark, and thereby, the recording emission interval changes depending on the information sequence. When a minimum mark/space length is designated as 3T (T representing the base period) such as in a CD or DVD, a space of length 3T that requires no waveform processing is inserted between marks requiring complicated waveform processing. The laser control circuit handles this space period as preparation time for the emission waveform processing of the next mark.

On the other hand, in multilevel recording, marks of various sizes (areas) are each recorded at the center of a cell, and thereby, the recording light emission has a regular period. However, a space is not provided between the cells and waveform processes have to be successively performed.

In summary, the two major differences between the laser control circuit for bi-level recording and the laser control circuit for multilevel recording are:

1) the positioning of the recorded marks (irregular/regular)
2) the arrangements for waveform processing of the recorded marks (insertion/non-insertion of space between the recorded marks as preparation time)

Thus, the conventional laser control circuit for bi-level recording cannot be used for the multilevel recording, and measures have to be taken to adapt the laser control circuit for multilevel recording.

Further, there is a problem in that a wobble signal and a servo signal suitable for multilevel recording cannot be properly detected in the conventional art.

SUMMARY OF THE INVENTION

Accordingly, the present invention has been conceived in response to one or more of the above-described problems of the related art and its object is to improve the quality of signals detected during recording while maintaining the recording performance. According to one aspect of the present invention, the conventional off power period is divided into an off power period for maintaining the rapid cooling effect as desired or necessary in the mark formation and a bias power period in which signal detection is possible, the divided periods being arranged to have differing powers.

Also, it is another object of the present invention to improve the signal detection performance, and to improve the control accuracy of the laser beam light intensity in multilevel recording. Further, it is an object of the present invention to enable output of a laser beam having an emission waveform that is adapted for multilevel recording while maintaining the recording performance.

Additionally, it is another object of the present invention to enable optimal detection of a wobble signal and a servo signal in recording multilevel information using the write pulse, the off pulse, the space pulse, and the bias pulse.

According to another aspect, the present invention provides an optical information recording method for recording multilevel information on an optical information recording medium, wherein an area of the optical information recording medium is divided into approximately uniform cells, and marks that can be formed in a plurality of sizes are recorded on the cells by irradiating a laser beam of which a light intensity is modulated according to the multilevel information being recorded, the method including the step of:

irradiating the laser beam on the cells thereby to record a mark thereon, wherein the laser beam includes a write power period having a predetermined light intensity, an off power period having a light intensity lower than the predetermined light intensity of the write power period, a space power period having a light intensity that is lower than the light intensity of the write power period and higher than the light intensity of the off power period, and a bias power period having a light intensity that is lower than the light intensity of the space power period and higher than the light intensity of the off power period.

According to another aspect, the present invention provides an optical information recording apparatus that is adapted to record multilevel information on an optical information recording medium, wherein an area of the optical information recording medium is divided into approximately uniform cells, and marks that can be formed in a plurality of sizes are recorded on the cells by irradiating a laser beam of which a light intensity is modulated according to the multilevel information being recorded, the apparatus including:

a unit for recording each mark by arranging the laser beam to include a write power period having a predetermined light intensity, an off power period having a light intensity lower than the predetermined light intensity of the write power period, a space power period having a light intensity that is lower than the light intensity of the write power period and higher than the light intensity of the off power period, and a bias power period having a light intensity that is lower than the light intensity of the space power period and higher than the light intensity of the off power period.

According to a further aspect, the present invention provides an optical information recording apparatus that is adapted to record multilevel information on an optical information recording medium, wherein an area of the optical information recording medium is divided into approximately uniform cells, and marks that can be formed in a plurality of sizes are recorded on the cells by irradiating a laser beam of which a light intensity is modulated according to the multilevel information being recorded, the apparatus including:

a unit that inputs a clock signal indicating a cell frequency and the multilevel information corresponding to each cell, and determines a laser beam emission waveform for each cell based on the input clock signal and multilevel information; and a unit that records the multilevel information on each cell by irradiating the laser beam according to the determined laser beam emission waveform.

According to another aspect, the present invention provides a laser control circuit adapted to modulate a light intensity of a laser beam irradiated for recording multilevel information on an optical information recording medium, wherein an area of the optical information recording medium is divided into approximately uniform cells and marks that can be formed in a plurality of sizes are recorded on the cells according to the multilevel information being recorded, the laser control circuit including:

a unit that inputs a clock signal indicating a cell frequency and the multilevel information corresponding to each cell, and determines a laser beam emission waveform for each cell based on the input clock signal and multilevel information.

According to another aspect, the present invention provides a wobble signal detection method in multilevel recording for recording multilevel information on an optical information recording medium, wherein an area of the optical information recording medium is divided into approximately uniform cells, and marks that can be formed in a plurality of sizes are recorded on the cells by irradiating a laser beam according to the multilevel information being recorded, the laser beam including a write pulse having a predetermined light intensity, an off pulse having a light intensity lower than the predetermined light intensity of the write pulse, a space pulse having a light intensity that is lower than the light intensity of the write pulse and higher than the light intensity of the off pulse, and a bias pulse having a light intensity that is lower than the light intensity of the space pulse and higher than the light intensity of the off pulse, the wobble signal detection method including the steps of:

detecting a push-pull signal from the optical information recording medium; and removing cell frequency components from the detected push-pull signal to extract a wobble signal indicating a track wobble formed on the optical information recording medium.

According to another aspect, the present invention provides an optical information recording apparatus including a control unit that performs control based on a wobble signal detection method in multilevel recording according to the present invention.

According to a further aspect, the present invention provides an optical information recording medium including:

an area that is divided into approximately uniform cells on which marks that may be in a plurality of sizes are formed according to information being recorded; wherein a frequency of a wobble signal detected from a pre-formed track wobble is no more than $1/10$ of a cell frequency.

According to another aspect, the present invention provides a servo signal detection method in multilevel recording for recording multilevel information on an optical information recording medium, wherein an area of the optical information recording medium is divided into approximately uniform cells, and marks that can be formed in a plurality of sizes are recorded on the cells by irradiating a laser beam according to the multilevel information being recorded, the laser beam including a write pulse having a predetermined light intensity, an off pulse having a light intensity lower than the predetermined light intensity of the write pulse, a space pulse having a light intensity that is lower than the light intensity of the write pulse and higher than the light intensity of the off pulse, and a bias pulse having a light intensity that is lower than the light intensity of the space pulse and higher than the light intensity of the off pulse, the servo signal detection method including the steps of:

detecting a raw servo signal from the optical information recording medium; and removing high frequency components corresponding to at least one of a wobble signal and a cell frequency from the detected raw servo signal to extract a servo signal.

According to a further aspect, the present invention provides an optical information recording-playback apparatus including a unit for recording or replaying information by determining a position of a laser beam being irradiated on an optical information recording medium based on a servo signal detected by a servo signal detection method according to the present invention.

BRIEF DESCRIPTION OF THE DRAWINGS

FIGS. 3A-3D are diagrams illustrating an outline of the multilevel recording operation performed in the optical disk apparatus shown in FIG. 1;

FIGS. 4A-4D are diagrams showing laser emission waveforms for multilevel recording in the optical disk apparatus shown in FIG. 1;

FIGS. 5A-5C are waveform diagrams illustrating a process for making fine adjustments in a bias pulse width in the optical disk apparatus shown in FIG. 1;

FIGS. 7A-7E are diagrams illustrating the timing of operating a high frequency modulator (HFM) during the bias power period;

FIGS. 11A-11D are diagrams illustrating a case of successively recording marks of a uniform size in multilevel recording;

DESCRIPTION OF THE PREFERRED EMBODIMENTS

In the following, preferred embodiments of the present invention are described with reference to the accompanying drawings.

Figure 1:
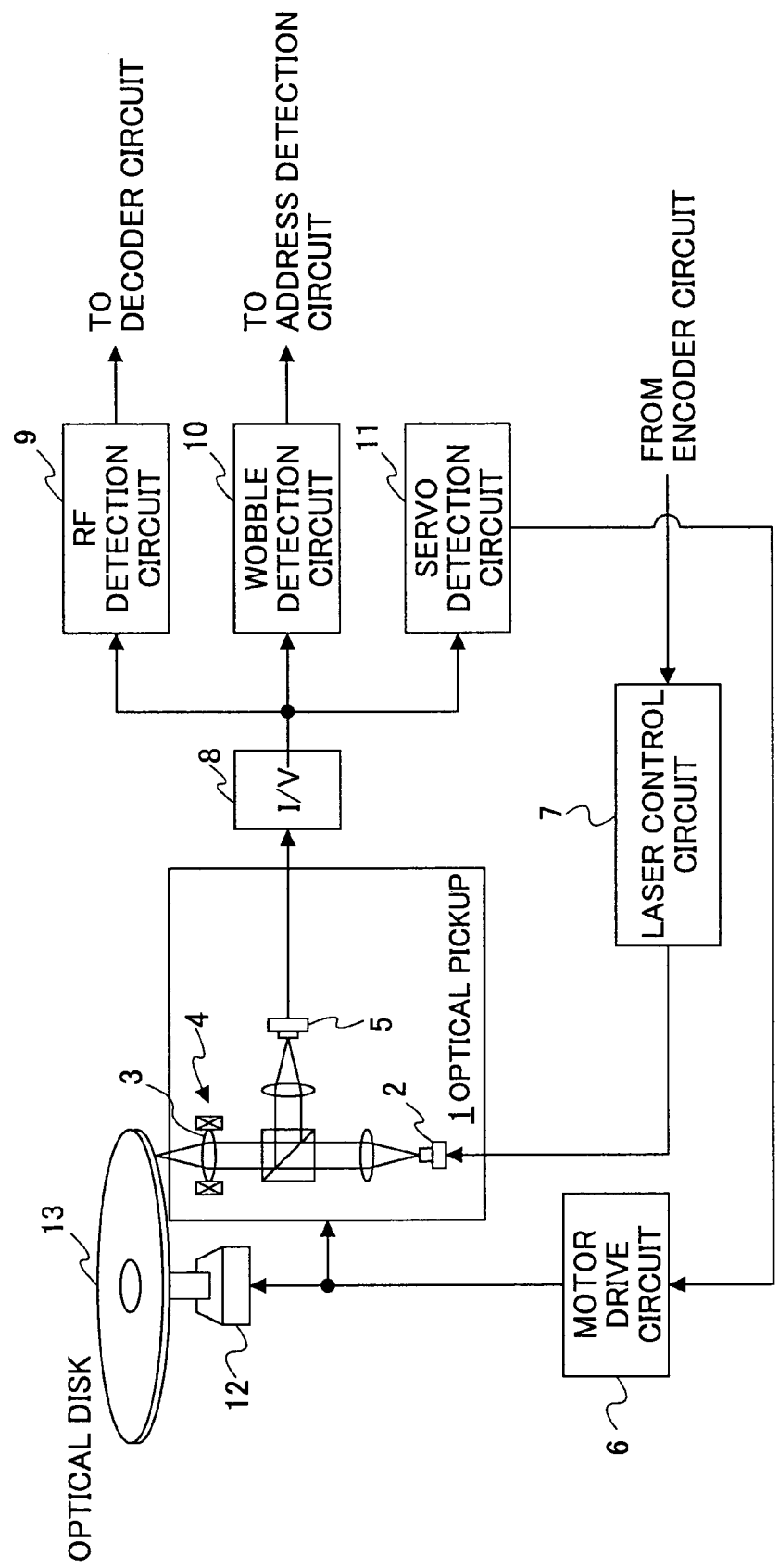
FIG. 1 is a block diagram showing a configuration of an optical disk apparatus according to an embodiment of the present invention.

FIG. 1 is a block diagram illustrating a configuration of an optical disk apparatus according to an embodiment of the present invention.

This optical disk apparatus is an optical information recording apparatus such as a CD drive or a DVD drive, and includes an optical pickup unit 1 implementing an optical system, a motor 12 that drives the optical pickup unit 1 to move and rotate an optical disk 13 (i.e., information recording medium such as a CD or a DVD), a motor drive circuit 6 that controls the rotation of the motor 12, and other suitable electrical circuits.

The optical pickup unit 1 includes a laser light source 2, an optical component that guides the rays of the laser beam emitted from the laser light source 2 to various elements (not shown) in a known manner, an objective lens 3 that condenses the laser beam rays into a spot on the optical disk 13, and an actuator 4 that controls the lens position so as to direct the beam spot to the desired position, and an optical receiver (PD: photodiode) 5.

The various circuits of the optical disk apparatus include a laser control circuit 7 that controls the laser emission of the laser light source 2 according to signals from an encoder.

The laser control circuit 7 has a function of administering the recording of each mark on cells formed on an area of an optical recording medium by arranging a recording laser beam to include a write power period having a predetermined high light intensity, an off power period having a light intensity lower than the predetermined light intensity of the write power period, a space power period having a light intensity that is lower than the light intensity of the write power period and higher than the light intensity of the off power period, and a bias power period having a light intensity that is lower than the light intensity of the space power period and higher than the light intensity of the off power period.

Figure 2:
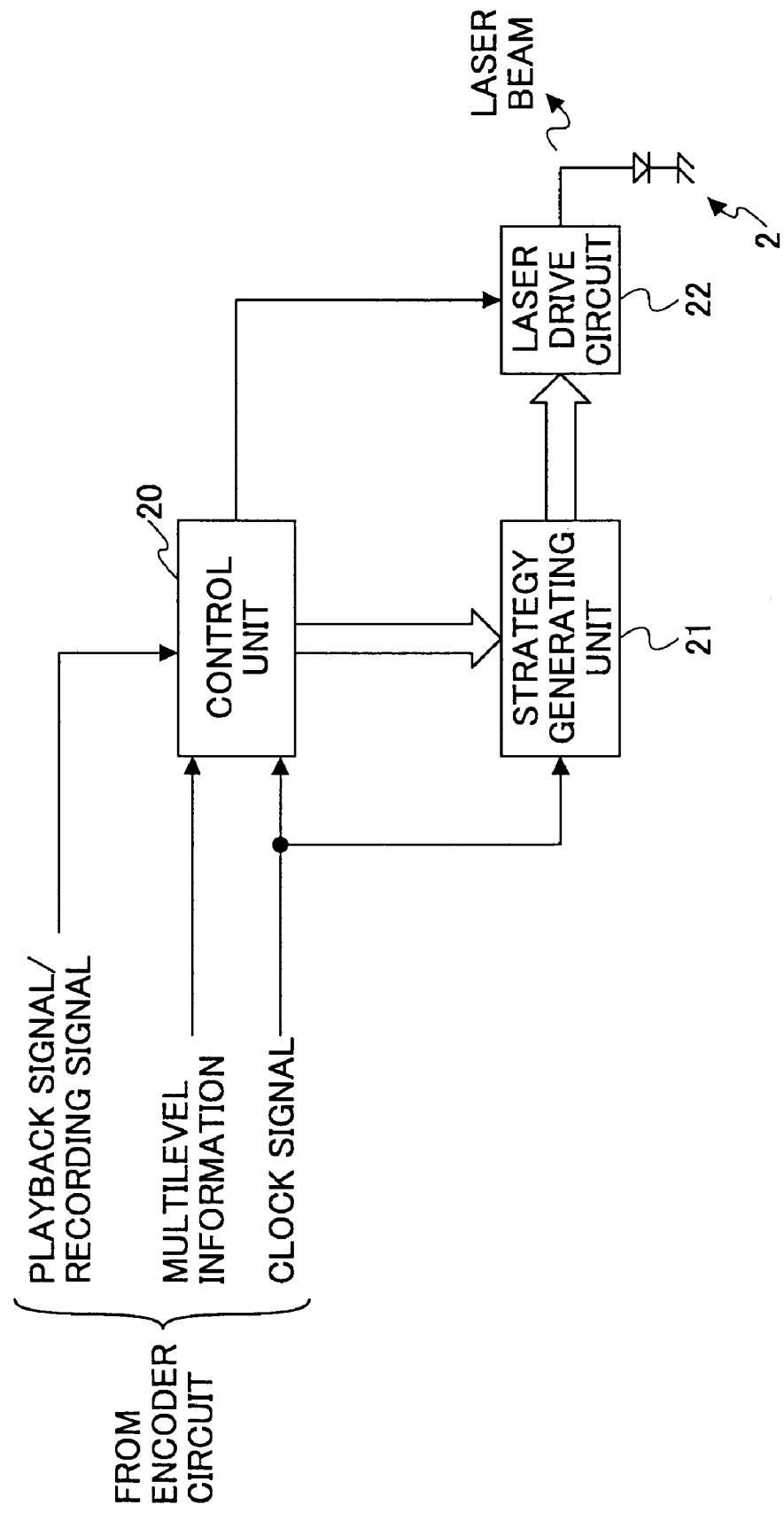
FIG. 2 is a block diagram showing a circuit configuration of a laser control circuit shown in FIG. 1.

FIG. 2 is a block diagram showing an exemplary internal circuit configuration of the laser control circuit 7. According to this drawing, the laser control circuit 7 includes a control unit 20, a strategy generating unit 21, and a laser drive unit 22.

User data transmitted from an external source as recording data are converted into multilevel information at an encoder circuit (not shown) that is controlled by a CPU (not shown). The multilevel information obtained by the encoder circuit is then sent to the control unit 20 of the laser control circuit 7. Other signals such as a signal indicating the recording/playback state, and a clock signal indicating the cell frequency in synch with the multilevel information are also sent to the control unit 20.

In the example of FIG. 2, the signals are supplied from the encoder circuit; however, the signals may also be supplied from different circuits. For example, the playback signal/recording signal may be sent from the CPU, and the clock signal may be sent from a clock generation circuit.

The control unit 20 sets the strategy generating unit 21 and the laser drive unit 22 based on the received signals, for example.

Based on, for example, the output signal of the control unit 20 and the clock signal, the strategy generating unit 21 generates a pulse signal according to the timings of the write power period, the off power period, the bias power period, and the space power period in which the laser beam is irradiated with a write power Pw, an off power Pof, a bias power Pb, and a space power Ps, respectively.

The laser drive unit 22 determines the driving current for the laser light source 2 based on, for example, a delayed playback signal/delayed recording signal (obtained by delaying the playback signal/recording signal by the processing time of the strategy generating unit 21), the pulse signal from the strategy generating unit 21 indicating the timings of the write power period, the off power period, the bias power period, and the space power period, in which the laser beam is emitted with the write power Pw, the off power Pof, the bias power Pb, and the space power Ps, respectively, and an intensity signal pre-designated for each pulse.

In other words, the control unit 20, the strategy generating unit 21, and the laser drive unit 22 have the function of inputting a clock signal indicating a cell frequency and multilevel information corresponding to each cell, and determining a laser beam emission waveform for each cell based on the input clock signal and multilevel information.

Further, since the current-light output characteristic of the laser light source 2 differs greatly depending on the temperature, the laser drive unit 22 has an output control function for detecting the output light intensity and stabilizing the output. The light intensity detection may be performed by the optical receiver 5 implemented in the laser light source 2, or otherwise, an optical system for detecting the light intensity may be provided separately. Also, the laser drive unit 22 may have a high frequency superposing function for reducing output noise of the laser light source 2.

Other circuits include an I/V circuit 8 that performs current-to-voltage conversion on a reflection signal from the optical disk 13 received at the optical receiver 5, the resulting converted signal being sent to a number of different detection circuits.

The I/V circuit 8 corresponds to a first stage circuit and, herein, suitable conversion efficiency rates (gains) are set for playback and recording, respectively.

An RF detection circuit 9 extracts multilevel information components recorded on the optical disk 13, and sends the detected components to a decoder circuit (not shown). In turn, the decoder converts the multilevel information components into user data.

A wobble detection circuit 10 extracts wobble signal components embedded in the track formed on the optical disk 13 from a push-pull signal indicating a difference between the outputs from respective parts of the optical receiver 5 divided by a division line extending in the direction of the track tangent line on the optical disk 13, and sends the extracted components to an address detection circuit (not shown) and a clock generation circuit (not shown) so that the wobble signal can be used for managing the absolute positioning of the optical disk 13, generating a clock signal in synch with the medium rotation, and controlling the medium rotation, for example. A timing signal suitable for the detection of the wobble signal is mainly supplied by the laser control circuit 7.

A servo detection circuit 13 extracts position information of the laser beam spot and sends an instruction to the motor drive circuit 6 that directs the beam spot to the desired position and drives the optical pickup unit 1 and the actuator 4 to move.

FIGS. 3A-3D are diagrams illustrating an outline of a multilevel recording operation performed in the optical disk apparatus of FIG. 1.

As is shown in FIG. 3A, imaginary cells having virtually uniform lengths are defined on the track formed on the optical disk 13, and one recording mark is formed at the center of each of the imaginary cells. As an example, in this drawing, marks of level 3 (L3), level 4 (L4), and level 1 (L1) are respectively recorded on three consecutive imaginary cells. In FIG. 3B, exemplary shapes of the recording marks are shown.

FIG. 3C shows an example of a laser emission waveform for recording the marks. The laser emission waveform includes the write power period that is irradiated with the write power Pw, the off power period that is irradiated with the off power Pof, the bias power period that is irradiated with the bias power Pb, and the space power period that is irradiated with the space power Ps.

FIG. 3D shows an example of a playback signal obtained from the reflected light of each cell during playback. By determining the signal intensity level of the playback signal, the area of the mark recorded on each cell can be estimated and the recorded information can be replayed based on the area of each cell.

For example, if three different recording marks having three different areas (L1~L3) can be recorded on the imaginary cells and replayed, this means that information of four levels or two bits (i.e., no mark, mark L1, mark L2, and mark L3) can be stored in each cell. On the other hand, if seven different recording marks (L1~L7) can be distinguished, information of eight levels or three bits can be stored in each cell.

Multilevel information recording can be realized by establishing a fixed relation between the area of the recording mark and the amplitude of the playback signal within an area no more than the optical resolution.

As the cell length is shortened, it becomes increasingly difficult to distinguish the levels of the multilevel information being recorded on the imaginary cells since the differences between each of the levels become smaller.

On the contrary, when the cell length is increased to the extent that the cell area exceeds the optical resolution, the signal amplitudes are saturated and it will therefore be impossible to distinguish the multilevel information. For the reasons explained above, some limitations are desired or necessary to be set to the relation between the spot diameter and the cell length (cell width).

Further, it is noted that the imaginary cells do not necessarily have to be defined in absolutely equal lengths throughout the entire medium. Rather, the lengths of the imaginary cells may vary somewhat as long as the varied lengths are within a range that can render proper distinction of the multilevel information.

Thus, for example, in a case where the recording area of the optical disk 13 is partitioned in the radial direction to form a number of zones and a CAV format with a fixed medium rotation angular velocity is used in each of the zones, the cell length grows longer as the cell moves toward the outer perimeter in each zone. However, by increasing the number of zones, the difference between the cell lengths at the inner perimeter side and the cell lengths at the outer perimeter side within the zone may be minimized and multilevel information can be accurately distinguished.

FIGS. 4A-4D are diagrams showing the laser emission waveforms for recording multilevel information in the optical disk apparatus shown in FIG. 1.

In this example, the laser beam emission waveform for recording a mark on an imaginary cell can record information in four levels (L1~L4). As shown in the drawings, each laser emission waveform for recording a mark includes a write power period that is irradiated with the write power Pw set to a high light intensity that enables mark formation, an off power period that is irradiated with the off power Pof set to a light intensity that is lower than that of the write power Pw, a bias power period that is output after the off power period and is irradiated with the bias power Pb set to a light intensity that is lower than the space power Ps but higher than the off power Pof, and a space power period that enables space formation and is irradiated with the space power Ps set to a light intensity lower than the write power period Pw but higher than the off power Pof. However, it is noted that the laser emission waveform for recording the mark at level L1 does not include the bias power period.

It is also noted that in the drawings, the oval shaped figures filled in with hatched lines are imaginary cells representing the positioning of the recording marks with respect to the cells; therefore, these figures do not represent the actual shapes of the recording marks.

Upon recording a mark, the emission timings of the write power period, the off power period, and the bias power period are shifted from the center position of the imaginary cell according to the level of the mark so that the mark is formed at the center of the imaginary cell.

In the following, processes performed in the optical disk apparatus according to an embodiment of the present invention will be described.

Upon recording a mark on a cell, the laser control circuit 7 irradiates a laser beam with the write power Pw set to a predetermined high light intensity during the write power period. For example, the laser control circuit 7 may irradiate a laser beam at a light intensity of 14 mW so that the recording layer of the optical disk melts. Then, during the off power period, a laser beam with the off power Pof set to a lower light intensity than that of the write power Pw is irradiated. In this period, light emission is very weak and hardly any light is irradiated. For example, a laser beam with a light intensity of 0~0.5 mW may be irradiated so that the recording layer of the optical disk is rapidly cooled. Thus, the front edge of the mark is formed.

In the conventional optical disk apparatus, the laser beam corresponding to the off power period is irradiated until the required mark length is formed, and then the laser beam corresponding to the space power period having a light intensity that enables erasing of the mark is irradiated. For example, a laser beam with a light intensity of 7 mW may be irradiated during the space power period to form the rear edge of the recording mark.

However, in the present embodiment, a bias power period in which a laser beam with the bias power Pb set to a light intensity lower than the space power Ps and higher than the off power Pof (i.e., Ps>Pb>Pof) is provided after the off power period. For example, a laser beam with a light intensity of 1~2 mW may be used for the bias power period.

The light intensity Pb of the laser beam corresponding to the bias power period is preferably within a level range at which signal components can be protected from being confused with noise in the first stage circuit gain for recording (which is lower than the gain for playback) while the recording characteristic is maintained. Thus, the recording layer is cooled during the off power period after the write power period so that the mark is formed, and the mark is not degraded even when laser beam having a higher light intensity than that of a replay power Pr is irradiated during the bias power period. Further, it is noted that the specific light intensity values given in the above description are merely examples, and these values may vary depending on the layer characteristics of the medium.

In the laser beam emission waveform of the conventional optical disk apparatus, when short marks are consecutively formed, the signal can be detected during the space power period and sufficient recording quality can be achieved. However, when long marks such as marks at level 4 (L4) are consecutively formed, the write power period and the off power period in which signal detection cannot be performed take up a large portion of the laser beam irradiation time, and the space power period in which signal detection is possible is very short so that the recording quality is degraded.

However, according to the present embodiment, signal components can be extracted during the bias power period so that the recording quality is not degraded even when long marks are consecutively formed. Also, according to the above recording process, the bias power period is inserted after the off power period; however, the timing of the bias power period is not limited to this arrangement and the bias power period can be inserted at any timing during the laser beam irradiation period for recording the mark.

By inserting the bias power portion having a light intensity in between the light intensities of the off power portion and the space power portion in the laser beam emission waveform for mark formation, the degradation of recording quality can be prevented, various detection signals can be detected even during consecutive recording of long marks, and the laser beam output control can be stabilized.

In the following, further processes performed in the optical disk apparatus of the present embodiment will be described.

In order to accurately form a recording mark with the right size on the optical disk, the laser beam emission timing during the bias power period may be adjusted for each recording.

The expression "accurately forming the recording mark with the right size" does not imply that the physical area of the recording mark has to correspond to the multilevel value (level of multilevel information), but rather, the mark area is arranged for the recorded multilevel information to be easily distinguished in the playback signal.

In multilevel information recording, since a mark that is smaller than the optical resolution is formed, the time width of the write power period required for the initial formation of the recording mark is generally fixed regardless of the multilevel information. Thus, the main factors for determining the mark area representing multilevel information are the "time width of the off power period+time width of the bias power period".

The time width of the off power period required for cooling the recording layer of the optical disk for each set of multilevel information is determined by the recording layer characteristic and is therefore fixed regardless of the multilevel information.

In the present embodiment, the laser control circuit 7 adjusts the time width of the bias power period for each set of multilevel information by arranging the time width of the bias power period to correspond to the sum of a time portion that is in proportion to the level of multilevel information being recorded (multilevel value) and a time portion that is adjusted according to each set of multilevel information.

The process of adjusting the time width of the bias power period according to each set of multilevel information being recorded relies on the fact that a mark with an area distribution of "multilevel value-1" is formed on each cell so that the time width of the bias power period is approximately proportional to the level of the multilevel information being recorded.

FIGS. 5A-5C are diagrams illustrating the process of adjusting the time width of the bias power period in the optical disk apparatus of the present embodiment.

FIG. 5A shows the waveform of a cell clock indicating the cell frequency (clock signal); and FIG. 5B shows the waveform of an n-multiplied clock signal (n being an integer) having a period of an n-multiplied frequency of the cell clock. As shown in FIG. 5C, the bias pulse time changes proportionally in units of time width Tx according to the level of the multilevel information being recorded. That is, the time width of the bias power period for recording the mark L2 is longer than the time width of the bias power period for recording the mark L1 by the time width Tx, the time width of the bias power period for recording the mark L3 is longer than the time width of the bias power period for recording the mark L1 by 2Tx (double the time width Tx).

However, the recording layer of the optical recording medium does not necessarily have a linear characteristic and the time required for obtaining a desired playback signal level varies depending on the multilevel values of the preceding and subsequent cells. Thus, fine adjustments are preferably made in the time width of the bias power period within a time width Ty provided for each level of multilevel information as shown in FIG. 5C. The laser control circuit 7 determines the time width of the bias power period by making the fine adjustments based on the computing equation: Tb=(a−1)Tx+Ty (Tb: time width of bias power period; a: multilevel value).

Thus, the time width of the bias power period Tb for level 1 is Ty, the time width of the bias power period Tb for level 2 is "Tx+Ty", the time width of the bias power period Tb for level 3 is "2Tx+Ty", and the time width of the bias power period Tb for level 4 is "3Tx+Ty".

It is noted that in a case where a time portion proportional to the level of multilevel information is not used in adjusting the time width of the bias power period, the entire cell has to be considered in terms of the smallest optical resolution in managing the parameters for determining the time width of the bias power period for the multilevel information. On the other hand, in an arrangement where time width units are added/subtracted in proportion to the multilevel value, parameters for determining the time width of the bias power period are managed in terms of the multilevel value of the information being recorded and the corresponding fine adjustment portion rather than the entire cell so that the processing load of the laser control circuit 7 can be greatly reduced.

According to this embodiment, since the time width of the bias power period is made up of a proportional time portion that is added/subtracted according to the level of multilevel information (multilevel value) and a fine adjustment portion for each recording, the setting of the pulse width and timing of each power portion can be simplified.

In the following, a further embodiment of the present invention is described in which the laser control circuit 7 outputs the bias power period when the multilevel information satisfies a predetermined condition.

As is shown in FIG. 4A, when forming a mark by irradiating the laser beam corresponding to the write power period and the off power period for the minimum required time period, namely, when forming the mark L1, the laser beam for the bias power period is not irradiated. Also, when the recording information is L0, which represents a space (no mark), the laser emission waveform is made up of the space power period and, thereby, the laser beam for the bias power period is not generated. Further, in a case where the bias power period is very short (e.g., mark L2) so that signal components cannot be effectively detected, the laser beam emission for the bias power period may preferably be avoided.

This arrangement is made to prevent the degradation of the signal components owing to limitations in the optical receiver or the responding speed of the circuits, and to avoid undesirable influences from noise generated upon sampling signal components during a short period.

Thus, by outputting the laser beam for the bias power period when the multilevel information satisfies a particular condition, the laser beam emission for the bias power period can be prevented when a sufficient time width for accurate signal detection cannot be secured. As a result, errors in the signal detection can be avoided and high quality signals can be detected during the bias power period.

In the following, a further embodiment of the present invention is described in which the laser control circuit 7 controls the light intensity of the laser beam for the bias power period (Pb) to be higher than the light intensity of the laser beam irradiated in replaying the multilevel information (Pr).

The bias power Pb is preferably set to a maximum level within the level range at which sufficient recording quality can be secured for the signal detection. The replay power Pr is set to a level at which the recorded data can be protected from degradation even when the replay operation is performed for a long time. For example, the replay power Pr may be set to 0.7 mW. In other words, the replay power Pr is preferably set below the level at which the recording layer may be thermally degraded, but the bias power Pb may be higher than the replay power Pr since the bias power period during recording occurs in short periods.

Moreover, when the bias power Pb is set lower than the replay power Pr, and the first stage circuit gain is lower than that at the time of replay, it may be difficult to achieve the desired signal quality.

Thus, the light intensity Pb corresponding to the bias power Pb is preferably set to a light intensity that is higher than the replay power Pr so that desired effects from the bias power period can be obtained.

By arranging the bias power Pb of the bias power period to be higher than the light intensity during playback, the signals detected during the bias power period are prevented from being confused with noise even when the optimal circuit gain for recording is low.

In the following, a further embodiment of the present invention, particularly for a rewritable medium such as a phase change medium, will be described in which the laser control circuit 7 sets the light intensity of the space power period to a level at which the mark can be erased.

In a rewritable medium, the off power period with a low light intensity for the laser beam emission waveform in forming the recording mark of the multilevel information is prolonged and, also, the reflectivity of the rewritable medium is low so that signal detection cannot be performed in the off power period. However, by arranging the bias power period in the laser beam emission waveform according to the present invention, signal detection performance can be improved.

Thus, according to the present embodiment, improved signal detection performance can be achieved during the bias power period even when a rewritable medium is used in which case the detection of signal components is particularly difficult due to the low reflectivity of the medium as well as the low light intensity of the off power period.

In the following, a further embodiment of the present invention will be described in which the laser control circuit 7 detects the laser beam light intensities for the bias power period and the space power period and compensates the light intensity for the write power period based on the detected light intensities so as to maintain the accuracy of the output intensity of the laser beam.

Figure 6:
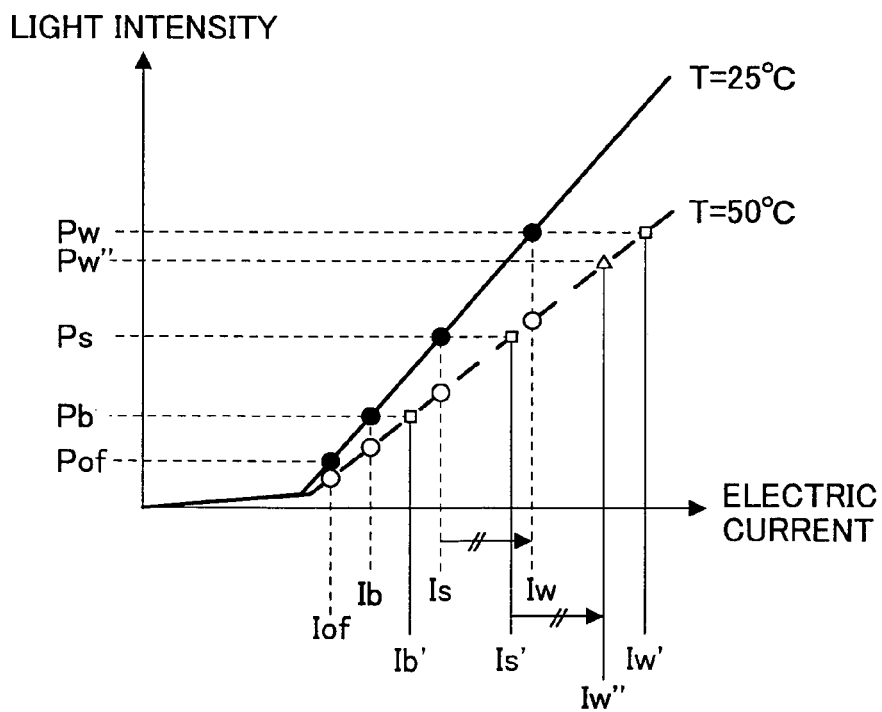
FIG. 6 is a graph showing current-light intensity characteristics of a laser beam according to temperature change.

FIG. 6 is a graph showing a current-light intensity characteristic of the laser beam in relation to the temperature.

The output characteristic of the laser beam differs greatly depending on the temperature. As shown in the graph, light intensity sensitivity to change in the electric current value (amount of electric current) is lower when the temperature (T) is 50° C. than when the temperature is 25° C.

Thus, for example, when the driving current is set to an electric current value Is that is capable of outputting the light intensity corresponding to the space power Ps for the space power period at the temperature 25° C., the output light intensity Ps is reduced to approximately ⅔ at the temperature 50° C. as indicated by the circle ○ on the dotted line of T=50° C. in the graph. Thus, by detecting the space power Ps of the output laser beam and controlling the electric current value so that the light intensity is constantly maintained at the same level, a corresponding electric current value Is' is obtained for the temperature 50° C. as indicated by the square □ on the dotted line of T=50° C.

However, controlling the light intensity corresponding to the write power Pw for the write power period is very difficult. This is because the width of the power portion of the write power Pw is short and thereby it is difficult to accurately detect the light intensity.

For example, when the electric current difference between the space power Ps and the write power Pw at the temperature 25° C. (Iw−Is) is added to the current value Is' (Is'+Iw−Is), the resulting electric current value Iw'' does not output the write power Pw at the temperature 50° C. but instead outputs a lower write power Pw'' as indicated by the triangle Δ on the dotted line of T=50° C., this effect being the result of the difference in sensitivity.

Thus, preferably, a light intensity of another power portion is detected in order to obtain the light intensity sensitivity, and the electric current value calculated based on the obtained sensitivity is used. In the optical disk apparatus according to the present embodiment, the light intensity of the bias power period is used.

Specifically, the laser control circuit 7 performs the algorithm processes described below.

First, while performing electric current control in order to maintain the space power Ps to a fixed level, the bias power Pb of the bias power period and its corresponding electric current value Ib' at the temperature 50° C. is detected. Then, based on the space power Ps, its corresponding electric current value Is', the bias power Pb, and its corresponding electric current value Ib', the sensitivity $(Is'-Ib')/(Ps-Pb)$ is calculated and the electric current value Iw' obtained from the equation $Iw'=Is'+(Pw-Ps)\times(Is'-Ib')/(Ps-Pb)$ is used as the driving current to output the write power Pw.

In the conventional optical disk apparatus, there is no suitable power portion except for the space power period to detect the light intensity, and although the off power period is long enough for light intensity detection, the light intensity of this power portion is very low so that accurate detection cannot be ensured.

Thus, if the off power Pof is used in the above-described algorithm to calculate the write power Pw, the difference in the electric current value with respect to temperature change is minimal as shown in the drawing so that errors can be made very easily in the detection of the change in sensitivity. In other words, the higher the light intensity, the easier it is to detect the temperature change and the less likely it is for errors to be made.

However, since the bias power period is provided for recording multilevel information according to the present embodiment, laser beam control can be performed in which the sensitivity is obtained by measuring the laser beam light intensities for the space power period and the bias power period, and the electric current value for a power portion that is unfit for light intensity detection, namely, the write power period, is determined based on the sensitivity.

In a case where the above-described algorithm is not used, the recording is periodically suspended to move away from the recording area and the current-light intensity characteristic of each power portion is checked and compensated.

Thus, by detecting the laser beam light intensities for the space power period and the bias power period, and compensating the light intensity for the write power period based on the detected light intensities, the information recording process does not have to be suspended to correct the laser emission characteristics when a change in the laser characteristics occurs due to a change in the temperature during mark recording. Thereby, the light intensity of each power portion is maintained at the optimum level so that high recording quality can be achieved.

In the following, a further embodiment of the present invention will be described in which a high frequency modulator is operated during the bias power period.

In recording multilevel information through laser beam emission, instability is created in the laser beam output due to influences from the returning light (reflected light), and this is particularly evident with a low output. To counter this effect, a high frequency modulator (FHM) is used. The high frequency modulator, which is used during playback in a low output, emits a laser beam with high frequency to stabilize the output and can be turned on/off.

Generally, the laser beam output is high during recording and, therefore, the high frequency modulator for removing influences from the returning light is not used.

However, in the case of multilevel recording, signal components are detected during recording in the bias power period, which has a low output, thereby creating the problem of an unstable output of the laser beam. Thus, the high frequency modulator is preferably operated during the bias power period as well so that the laser beam output can be stabilized.

According to the present embodiment, the laser control circuit 7 administers the high frequency modulator to operate during the bias power period.

FIGS. 7A-7E are diagrams illustrating the timing of operating the high frequency modulator (HFM) during the bias power period.

FIG. 7A shows the imaginary cells (the mark * in the drawing represents the numbers 1~4); FIG. 7B shows the imaginary recording marks (marks to be recorded); FIG. 7C shows the waveform of the powers in playback and recording; FIG. 7D shows the laser beam emission waveform when the high frequency modulator is operated during the bias power period; and FIG. 7E shows the waveform of the on/off timing signal for operating the high frequency modulator.

The laser control circuit 7 administers the high frequency modulator to operate during the bias power period according to the timing signal shown in FIG. 7E.

By operating the high frequency modulator during the bias power period, the laser beam output can be stabilized during the bias power period in which the light intensity level is low and high quality signal detection can be realized. It is noted that the high frequency modulator may be operated during the space power period as well.

In the following, a further embodiment of the present invention will be described in which a table indicating a predetermined relation between the multilevel information and the laser beam emission waveform is implemented.

Figure 8:
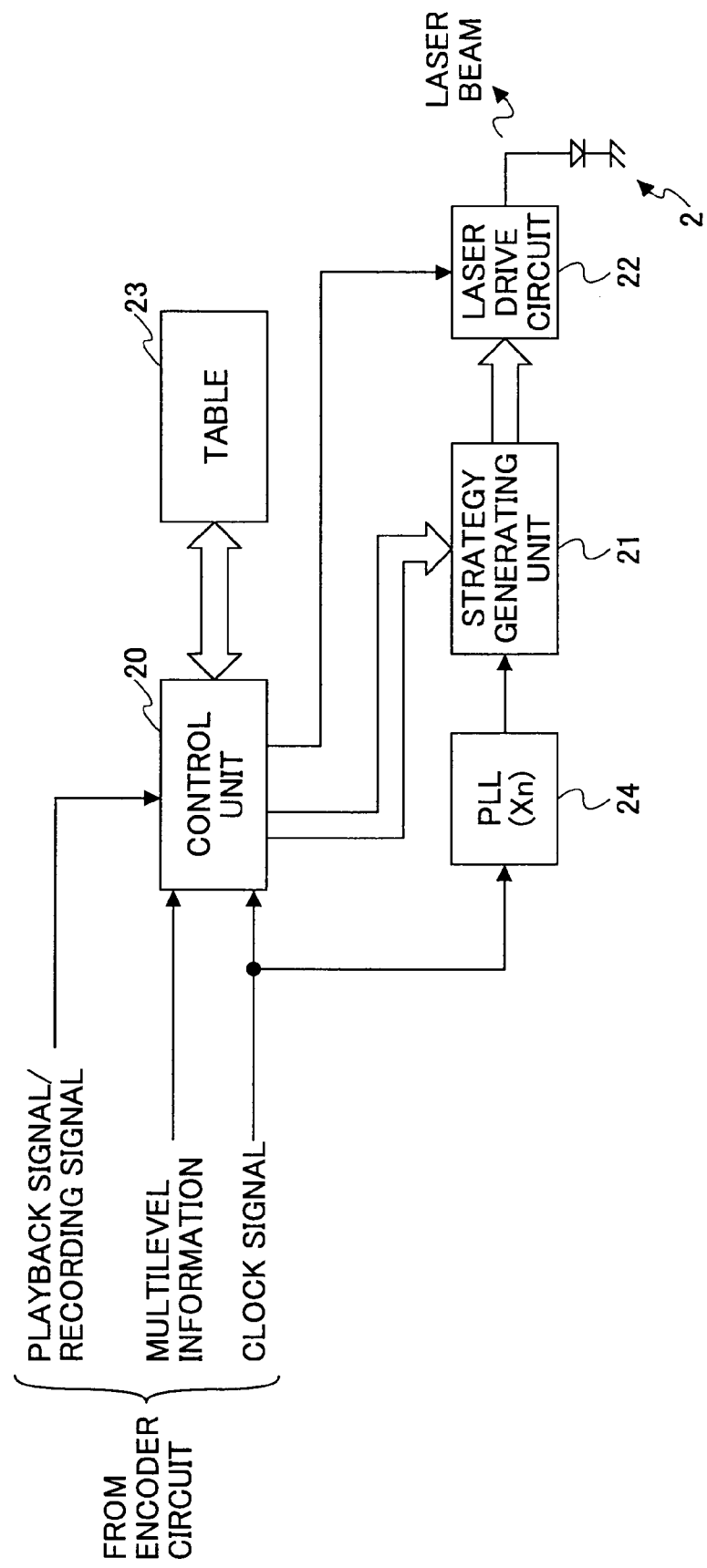
FIG. 8 is a block diagram showing another circuit configuration of the laser control circuit shown in FIG. 1.

FIG. 8 is a block diagram showing a circuit configuration of a modified laser control circuit.

By implementing this circuit configuration in place of the laser control circuit 7 shown in FIG. 1, a clock signal of the cell frequency in synch with the multilevel information and the multilevel information being recorded on each cell are input to the control unit 20, and a table 23 storing a pre-designated relation between the multilevel information and the laser emission waveform (strategy) is referred to in order to determine the appropriate strategy for each cell. The strategy for each cell includes the width and timing of each of the power portions.

For each cell, the referred-to data from the table 23 is sent to the strategy generating unit 21 and a control pulse (an emission timing signal of the laser beam emission of the write power period, the off power period, the bias power period, and the space power period) corresponding to the determined laser emission waveform of the cell is generated. The control pulse is then sent to the laser drive unit 22, which administers a laser beam to be emitted with the respective light intensities of the write power Pw, the off power Pof, the bias power Pb, and the space power Ps.

Herein, it is noted that the setting of the strategy of each cell may be realized without using the table 23, in which case a function of the multilevel information is used to determine the width of each power portion. Also, if the playback signal/recording signal is input to the control unit 20 and the high frequency modulator function is implemented in the laser control unit 22, a smooth operation of the high frequency modulator can be realized during playback and the bias power period.

Thus, by inputting a clock signal indicating the cell frequency and the multilevel information being recorded on each cell to determine the laser beam emission waveform for each cell, the recording mark can be accurately formed at the center of the cell, this recording method being characteristic of multilevel recording.

Further, by determining the laser emission waveform for each cell by referring to the table containing the pre-designated relation between the multilevel information and the emission waveform, and driving the laser beam emission based on the determined laser emission waveform, the characteristic multilevel recording method of forming the recording mark at the center of the cell can be realized by a waveform with widths and timings tuned for each set of recording information.

Also, the table preferably contains information for determining the laser beam emission waveform based on a set of multilevel information corresponding to at least three consecutive cells. According to this embodiment, the table contains information for setting the emission waveform using the multilevel information of the cell currently subjected to recording as well as the multilevel information of a preceding cell and a subsequent cell as parameters.

Figures 9, 10:
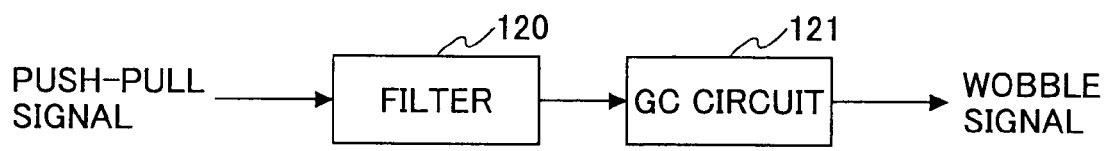
FIG. 9 is a table chart showing an exemplary format of a strategy table for 5-level recording.
FIG. 10 is a block diagram showing a circuit configuration for performing a first wobble signal detection process in multilevel recording.

FIG. 9 shows an exemplary format of the table (strategy table) in 5-level recording.

In this table, the multilevel information for the cell currently subjected to recording is denoted as 'current cell', the multilevel information for the cell immediately preceding the current cell is denoted as 'preceding cell' (this cell already having the information recorded thereon), and the multilevel information of the cell immediately following the current cell is denoted as 'subsequent cell' (this cell being subjected to recording after the recording of the current cell). The levels of each of the cells are laid out into a matrix, and the timing setting value of each of the control pulses is stored.

The values Tabc (a,b,c: 0~4) indicated in the table represent the timing setting values of the various control pulses. Herein, 'a' represents the multilevel information of the preceding cell, 'b' represents the multilevel information of the current cell, and 'c'. represents the multilevel information of the subsequent cell. Although in the table shown in FIG. 9, the timing setting values for the sets of multilevel information containing the preceding cell of level 2 and above are omitted, the table used in the present embodiment stores the emission waveform parameters for all the levels.

Further, with the table shown in FIG. 9, only one parameter for the control pulse (e.g., time width or fine adjustment time portion for the bias power period) can be designated; however, similar tables for designating other parameters such as the time width of the write pulse and/or the off pulse, for example, may be provided as well.

By storing the time width information and/or timing information according to the combination of the multilevel information for at least three consecutive cells in a table and determining the laser beam emission waveform by referring to the table, multilevel information can be recorded in a manner such that signal interference from marks of neighboring cells can be limited to known characteristics and removed in replaying the recorded medium so that playback performance can be improved and higher density can be achieved.

Further, a high frequency clock period generated based on the clock signal of the cell frequency is preferably used as the control pulse width and minimum resolution of the timing that are set at the strategy generating unit 21. In other words, a period of a frequency obtained by multiplying the frequency of the clock signal indicating the cell frequency by n (n being an integer) is used as a step for setting the laser beam emission waveform.

In the circuit configuration shown in FIG. 8, the clock signal of the cell frequency is input to a PLL circuit 24 where the frequency of this clock signal is multiplied by n (n being an integer) to produce an n-multiplied clock signal. The n-multiplied clock signal is then output to the strategy generating unit 21.

At the strategy generating unit 21, the period of the n-multiplied clock signal is used to count the timing and the pulse width according to the setting value obtained from the table 23 to thereby generate the control pulse.

The table 23 is set using the period of the n-multiplied clock signal as a step.

Thus, by arranging the clock signal of the cell frequency to be in accordance with the speed change of the medium, the pulse width of the control pulse generated at the strategy generating unit 21 can also be changed accordingly so that each recording mark can be recorded with the desired size even when the speed of the media changes.

Further, it is noted that the pulse width and timing can be changed using an analog delay element; however, this is not a very suitable arrangement since the delay time may change as a result of temperature change. Also, in the CAV method in which the recording speed successively changes according to the medium radial position, when the analog delay element is used to change the pulse width and timing, the number of the analog delay elements is increased thereby enlarging the circuit size; however, by using the period of the n-multiplied frequency of the clock signal indicating the cell frequency, the circuit size can be reduced.

Thus, by setting the laser emission waveform using the period of the n-multiplied frequency (n: integer) of the clock signal indicating the cell frequency as a step, the consistency of the mark size can be maintained even when a change occurs in the medium rotation speed and thereby high multilevel signal quality can be secured. Also, unlike the analog delay element, the present embodiment does not have the disadvantage towards temperature change, and thereby a small circuit can be realized even in the CAV method in which the recording speed is successively changed.

The optical disk apparatus according to the present embodiment is capable of detecting various signals at high quality even during recording. Also, this apparatus is capable of accurately controlling the light intensity of the laser beam and tuning the recording waveform according to recording information so that high recording quality can be realized.

Further, the present invention is very advantageous for a phase change (rewritable: RW) media in which an erasing power is used as the space power in the space power period; however, similar advantages may also be realized with other optical information recording media such as a write-once (recordable: R) medium that uses a waveform in which a lower light intensity is used for the space power period (since erasing is unnecessary). Also, it is noted that although in the above-described embodiments of the present invention, a recording mark is formed by arranging each of a write power period and an off power period, the present invention is not limited to this arrangement and, for example, adjustments may be made in a case where the off power period is set too long that a degradation occurs in the signal detection.

In the optical information recording method and the optical information recording apparatus according to the present invention, the off power period of the laser beam emission is divided into the off power period having the rapid cooling effect required for mark formation and the bias power period that enables signal detection, and by changing the light intensity of the laser beam according to the respective power portions, the quality of the signals detected during recording can be improved while the multilevel information recording performance can be maintained.

Also, by solving the problem of poor signal detection performance, which is a characteristic disadvantage of the waveform for multilevel recording, greater accuracy can be realized in controlling the light intensity of the laser beam. Additionally, the output of a laser beam having an emission waveform that is adapted for multilevel recording can be realized while maintaining the recording performance.

In the following, exemplary wobble signal detection processes in multilevel recording according to preferred embodiments of the present invention are described.

FIG. 10 is a block diagram showing a circuit configuration for realizing a first wobble signal detection process in multilevel recording according to an embodiment of the present invention.

FIGS. 11A-11D are diagrams illustrating a case of successively recording uniform marks on cells according to the multilevel information recording method of the present invention.

To realize the first wobble signal detection process, the wobble detection circuit 10 shown in FIG. 1 is arranged to include a filter 120 and a gain control (GC) circuit 21 as shown in FIG. 10.

Herein, the optical disk apparatus of FIG. 1 has the function of recording each mark on cells formed on an area of an optical recording medium by arranging a recording laser beam to include a write pulse having a predetermined high light intensity, an off pulse having a light intensity lower than the light intensity of the write pulse, a space pulse having a light intensity that is lower than the light intensity of the write pulse and higher than the light intensity of the off pulse, and a bias pulse having a light intensity that is lower than the light intensity of the space pulse and higher than the light intensity of the off pulse. Also, the filter 120 has the function of removing cell frequency components from a push-pull signal detected from the optical information recording medium. And, the GC circuit 121 has the function of extracting a wobble signal indicating the wobbling of a track formed on the optical information recording medium from the signal obtained by removing the cell frequency components from the push-pull signal.

Like a tracking signal, the wobble signal indicating the wobbling of the track formed on the optical disk 13 can be obtained from a push-pull signal (a difference signal indicating a difference between outputs of respective parts of the optical receiver 5 divided into two by a division line extending in the direction of a track tangent line direction).

Since the wobble signal frequency is higher than the frequency band of the tracking wobble, the wobble signal remains even during wobble operation and may be detected.

However, during recording, the intensity of the laser output is modulated and, thus, the detection of the wobble signal may be difficult.

Particularly, with recording laser beam emission without the bias pulse, an effective detection period cannot be secured when large marks are successively recorded one after the other. On the other hand, with laser light emission for recording including the bias pulse, effective detection of the wobble signal is possible during the bias pulse period.

Since the push-pull signal is a difference signal, ideally the laser intensity modulation components are removed and thus, the amplitude change of the wobble signal components is accurately detected.

However, in reality, a variation in the axes of the lens and the rays or a variation in intensities between the divided optical receiver parts due to a slanting of the medium may occur, for example, and thus, the intensity modulation components of the laser may be superposed on the push-pull signal thereby resulting in a degradation of the wobble signal.

In the following, the above problem is described in detail with reference to FIGS. 11A-11D.

On the imaginary cells shown in FIG. 11A, recording marks of various sizes may be formed. However, in the following, a case of successively forming a recording mark having a size that is half the cell length of the imaginary cells as shown in FIG. 11B is described as a simplified example. FIG. 11C shows the laser emission waveform for recording the marks.

The laser emission waveform is modulated using a plurality of light emission intensities. Due to the limitations in the transmission characteristics of the optical receiver and/or the circuits, a 'corruption' occurs in the reflection signal during the recording as shown in FIG. 11D. In the waveform shown in FIG. 11D, the transition between the space pulse and the bias pulse is apparent.

In this case, the frequency of this reflection signal is the same as that of the cell. When a difference in intensities occurs within the divided optical receiver due to some kind of fluctuation, the above-described reflection signal for recording remains in the push-pull signal to thereby become noise to the wobble signal components.

In other words, in multilevel recording, the cell frequency components are prone to being strongly superposed, and thus, in the circuit configuration for performing the first wobble signal detection process in multilevel recording, the filter 120 is inserted to remove the cell frequency components.

Also, depending on the format of the optical disk (recording medium) 13, a wobble signal for controlling the rotational speed of the medium obtained from the tracks of the media may be superposed to become noise. In this case, these components are removed as well.

Further, in a system arranged for high speed recording, the reflection light is also influenced by the write pulse and off pulse, and thereby a filtering characteristic that is able to remove components of higher frequency than the cell frequency is preferred. That is, the filter is preferably a low pass filter that cuts frequency components that are above the cell frequency. Also, the GC circuit 121 is implemented to perform gain compensation on the outputs of the filter 120 so that the amplitude of the wobble signal is suitably adjusted.

In this way, the cell frequency components are removed so that the degradation of the wobble signal due to a laser emission of a strong cell frequency for multilevel recording is prevented, and a wobble signal of high quality can be detected.

Next, a second wobble signal detection process in multilevel recording will be described.

Figure 12:
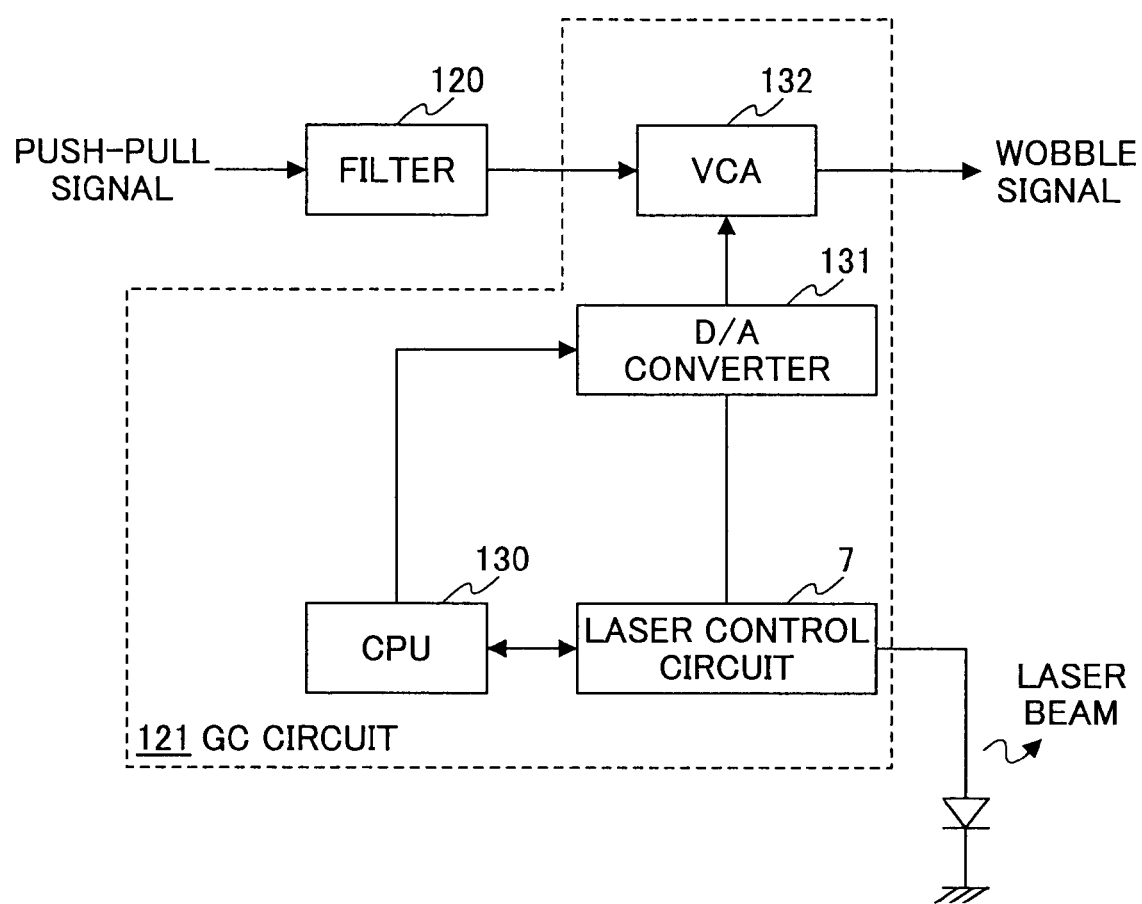
FIG. 12 is a block diagram showing a circuit configuration for performing a second wobble signal detection process in multilevel recording.

FIG. 12 is a block diagram showing a circuit configuration for performing the second wobble signal detection process in multilevel recording.

In the circuit configuration performing the second wobble signal detection process in multilevel recording, wobble signals of a certain signal quality level can be detected with a simple circuit configuration.

Generally, the laser emission intensity is optimized by conducting test-writing before recording of user data so that high quality multilevel information may be recorded. Herein, it is preferable that the optimum gain of the wobble signal changes as the light intensity of the laser rays changes.

The circuit configuration for performing the second wobble signal detection process as shown in FIG. 12 includes the filter 120 and the gain control (GC) circuit 121 as the laser control circuit 7 and the wobble detection circuit 10 shown in FIG. 1.

Specifically, the GC circuit 121 includes the laser control circuit 7, a CPU 130, a D/A converter 131, and a VCA 132.

In other words, the GC circuit 121 shown in FIG. 12 has the function of extracting a wobble signal using at least a setting value calculated based on the light intensity of the bias pulse and the light intensity of the space pulse for determining a gain that is to be applied to the signal obtained from removing cell frequency components from the push-pull signal.

In the GC circuit 121, the light intensity of the laser emission is managed by the CPU 130; that is, the CPU 130 sets the optimum light intensity value to the laser control circuit 7. Alternatively, the laser control circuit 7 itself may be arranged to read the current light intensity setting.

Based on the light intensity setting, the CPU 130 calculates the average laser emission amount obtained through imaginary smoothing of the light intensity modulation components, and sets the appropriate value to the D/A converter 131 to determine the gain of the VCA 132.

The gain of the VCA 132 changes according to the output voltage of the D/A converter 131. The average laser emission amount can be obtained based on the pulse width of each pulse managed by the CPU 130, the light intensity, and the generation rate of multilevel information.

Accordingly, the gain is changed to an optimal value in response to the successive change in the recording light intensity to secure recording quality with a simple circuit configuration, and to realize an optimal wobble signal detection process.

In the following, a third wobble signal detection process in multilevel recording will be described.

Figure 13:
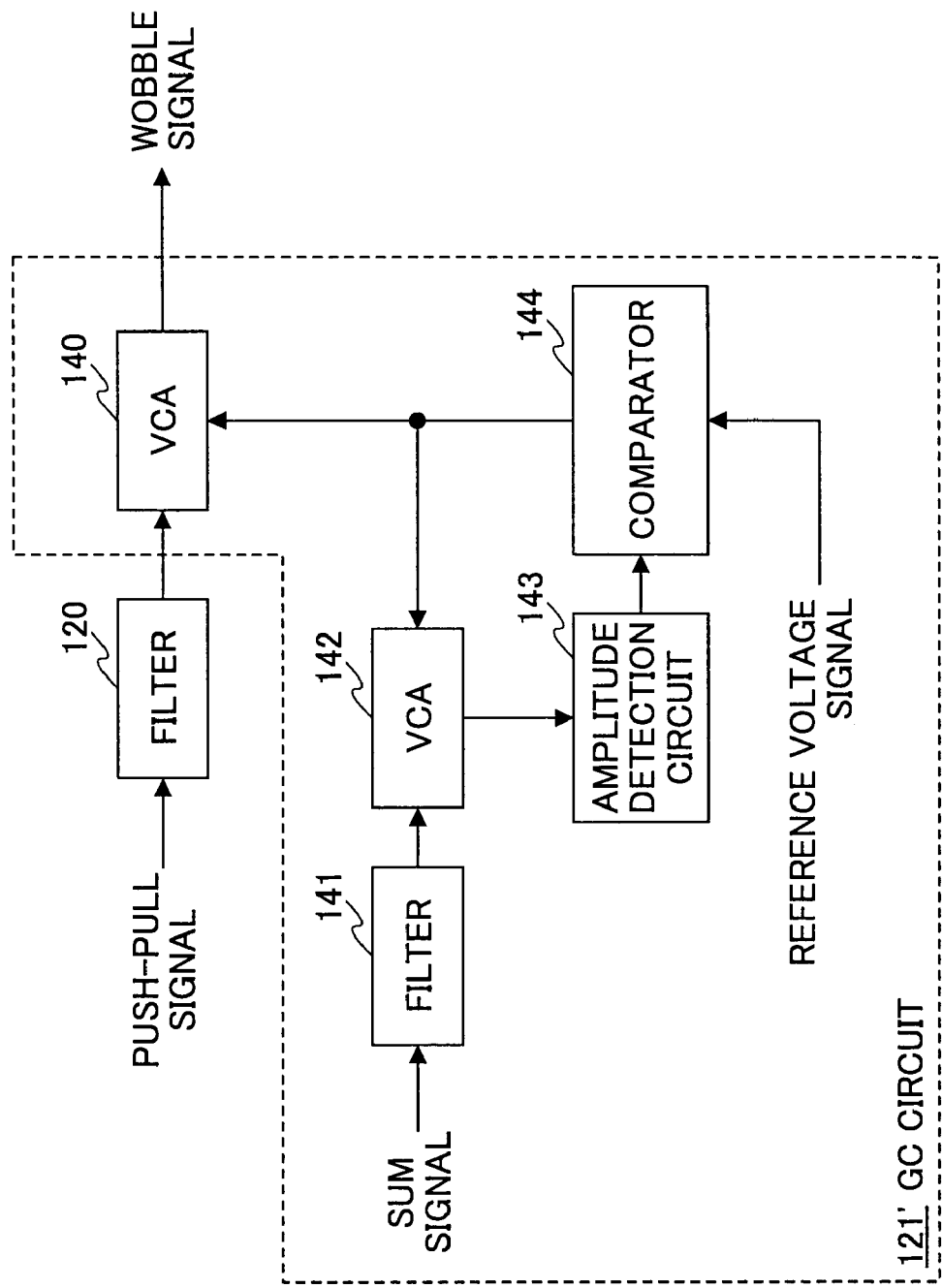
FIG. 13 is a block diagram showing a circuit configuration for performing a third wobble signal detection process in multilevel recording.

FIG. 13 is a block diagram showing a circuit configuration for performing the third wobble signal detection process in multilevel recording.

This circuit configuration is for realizing a stable wobble detection process in conjunction with a change in the average of the reflection signal (sum signal) during recording.

The sum signal changes at a low frequency due to a variation in the reflectivity of the medium surface or medium track, or a fluctuation in the laser intensity (lower in frequency than the modulation components of each pulse). Further, the sum signal changes depending on the continuity of the multilevel information. These fluctuations over a wide band may influence the wobble signal as factors for changing its gain.

Thus, by implementing the circuit for performing the third wobble signal detection process in multilevel recording, the above described problem may be prevented.

The circuit configuration as shown in FIG. 13 includes the filter 120 and a gain control (GC) circuit 121' as the wobble detection circuit 10 shown in FIG. 1.

The GC circuit 121' includes a VCA 140, a filter 141, a VCA 142, an amplitude detection circuit 143, and a comparator 144.

In other words, the GC circuit 121' shown in FIG. 13 has the function of extracting a wobble signal by amplifying or attenuating the signal obtained by removing the cell frequency components from the push-pull signal using a gain that is equivalent to a gain for maintaining the level of a signal obtained by removing wobble frequency components from the sum signal to a pre-designated reference voltage.

In this circuit, wobble frequency components are removed from the sum signal at the filter 141, and the output signal from the filter 141 is amplified or attenuated at the voltage gain control amplifier (VCA) 142. Then, at the amplitude detection circuit 143, the amplitude of the output signal from the VCA 142 is detected, and the output signal from the VCA 142 is compared with a pre-designated reference voltage signal at the comparator 144. Then, a voltage corresponding to the difference obtained from the comparison is output to the VCA 142 so that the gain is changed.

Owing to this loop, the gain of the VCA 142 is controlled so that the output signal amplitude of the VCA 142 reaches the pre-designated reference voltage. As for the push-pull signal, high frequency components at frequencies above the cell frequency are removed at the filter 120' after which the filtered signal is amplified or attenuated by the VCA 140. Herein, the gain used in the VCA 140 is equal to the gain set to the VCA 142.

Thus, by successively changing the gain in response to the fluctuation in the reflectivity of the media track or the laser emission intensity fluctuation in the recording of multilevel recording information with a periodic cycle to optimize the gain, an optimal wobble signal detection may be realized.

In the following, a fourth wobble detection process in multilevel recording will be described.

Figure 14:
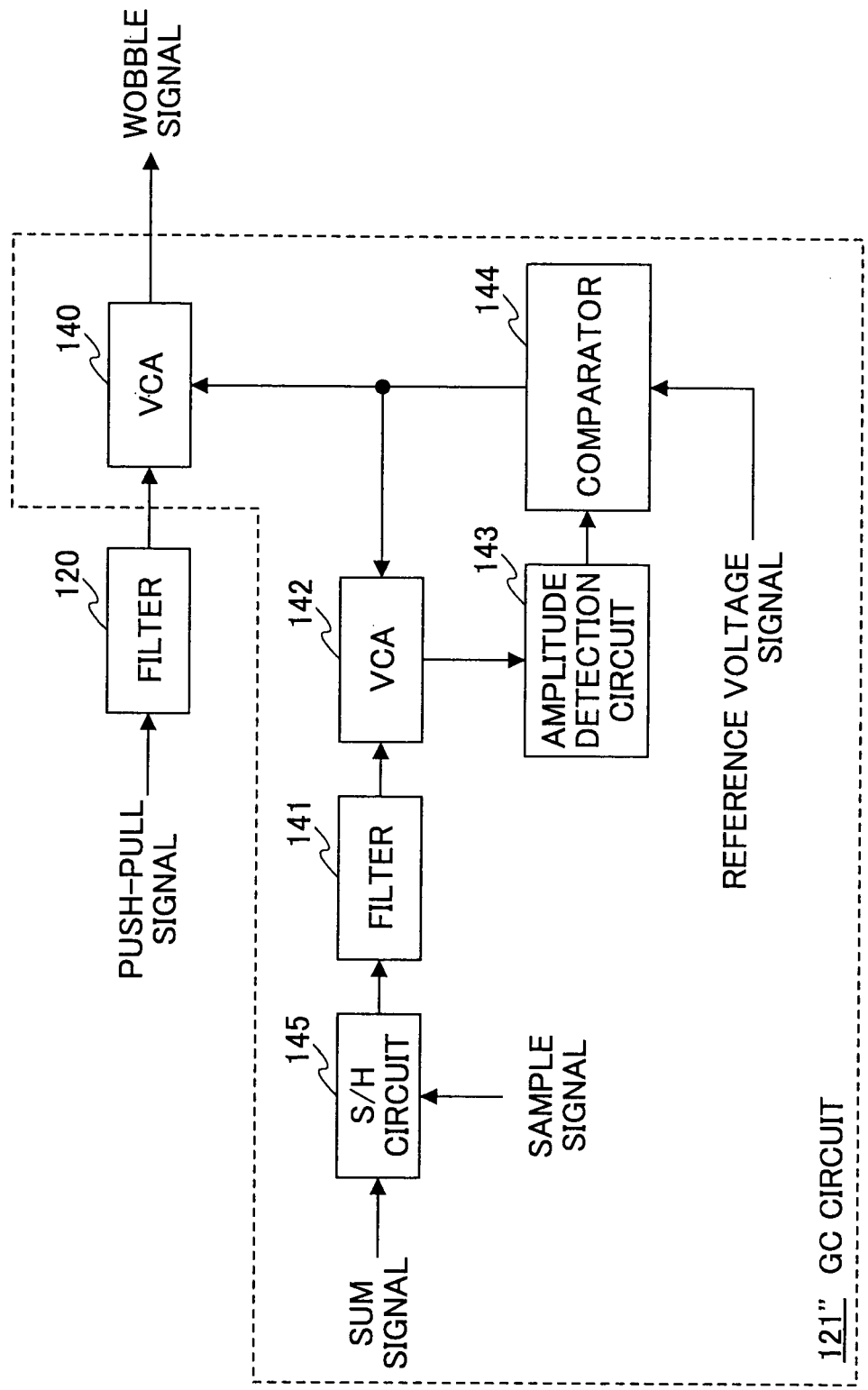
FIG. 14 is a block diagram showing a circuit configuration for performing a fourth wobble signal detection process in multilevel recording.

FIG. 14 is a block diagram showing a circuit configuration for performing the fourth wobble signal detection process in multilevel recording. It is noted that the parts that correspond to those shown in FIG. 13 are given the same numerical notations.

This circuit configuration is very similar to the circuit configuration for performing the third wobble signal detection process in multilevel recording; however, the circuit configuration in FIG. 14 further implements a sample hold (S/H) circuit 145 before the filter 141, and the sample signal obtained from a sampling process for the bias pulse period or the space pulse period is used as the base signal rather than using the average of the sum signal.

Thus, a GC circuit 121" shown in FIG. 14 has the function of extracting a wobble signal by amplifying or attenuating the signal obtained from removing cell frequency components from the push-pull signal using a gain equivalent to the gain for maintaining the level of a sum signal obtained during a laser emission period of the bias pulse or the laser emission period of the space pulse to a pre-designated reference voltage.

Since the circuit configuration for performing the fourth wobble signal detection process in multilevel recording is mostly identical to that for performing the third wobble signal detection process, the differing features of the latter configuration, namely, the S/H circuit 145 and the signal input to the filter 141 will be described.

As described earlier, the sum signal includes fluctuation relating to the continuity of the multilevel information. For example, when multilevel information of ten consecutive cells is: "0, 0, 0, 0, 0, 4, 4, 4, 4, 4", the sum signal contains a fluctuation having frequency components of $1/10$ the cell frequency. Normally, in order to separate the wobble frequency, the modulation pattern is controlled at the stage of multilevel modulation so that the fluctuation of the sum signal is prevented from being close to the wobble signal frequency. The modulation pattern control involves eliminating the use of a particular pattern after increasing the information amount by attaching redundant bits.

This in turn means that the recording density is reduced and thereby the advantage of achieving higher density in the multilevel recording method is diminished. Further, unlike bi-level recording, in multilevel recording, a complete separation of the frequencies through modulation pattern control is difficult.

For example, when the multilevel information is: "0, 1, 0, 1, 0, 7, 6, 7, 6, 7", although there is no continuity in the multilevel information, frequency components of 1/10 the cell frequency do exist in the signal as in the previous pattern with "0"s and "4"s. In order to completely eliminate a desired frequency, a significant amount of redundant bits need to be attached and many patterns need to be eliminated.

Realistically, it is impossible to completely remove the sum signal fluctuation components close to the wobble frequency, and some fluctuation is expected to remain in the signal.

When fluctuation close to the wobble frequency is superposed on the sum signal, the gain compensation performed on the wobble signal by the VCA 140 may do more harm than good depending on the band (phase delay) of the control loop including the VCA 142.

For example, if there is a fluctuation of 1/10 the cell frequency included in the sum signal and the wobble signal and if the phase delay of the control loop including the VCA 142 is 1/5 the cell frequency, the gain compensation of the VCA 142 and the VCA 140 will have inverse phases of the input so that when the amplitude of the input such as the sum signal or the wobble signal is large, the output is amplified and when the amplitude of the input is small, the output is attenuated.

In reality, since high frequency components are removed at the filter 141, the adverse effect of the gain compensation will not be as obvious as the above-described example; however, the same effect may occur with frequencies lower than the wobble frequency.

In order to avoid being misguided by the fluctuation of the sum signal due to the continuity of the multilevel information, the S/H circuit 145 obtains the sum signal during the bias pulse period or the space pulse period through sampling. Further, in order to improve the signal quality, the sampling may be limited to the recording timing of predetermined multilevel information.

For example, when recording the level "0", the space pulse is long, and when recording the level "7", the bias pulse is long. Thus, sampling errors due to the "corruption" of the signal can be reduced when sampling the above signal levels during the respective pulse periods.

Then, the output signal of the S/H circuit 145 is filtered at the filter 141 so that wobble frequency components are removed as described above and sampling noise is removed as well.

Thus, the gain is successively changed for optimization in response to the fluctuation in the reflectivity of the medium track so that optimal wobble signal detection can be performed.

In the following, a fifth wobble signal detection process in multilevel recording will be described.

Figure 15:
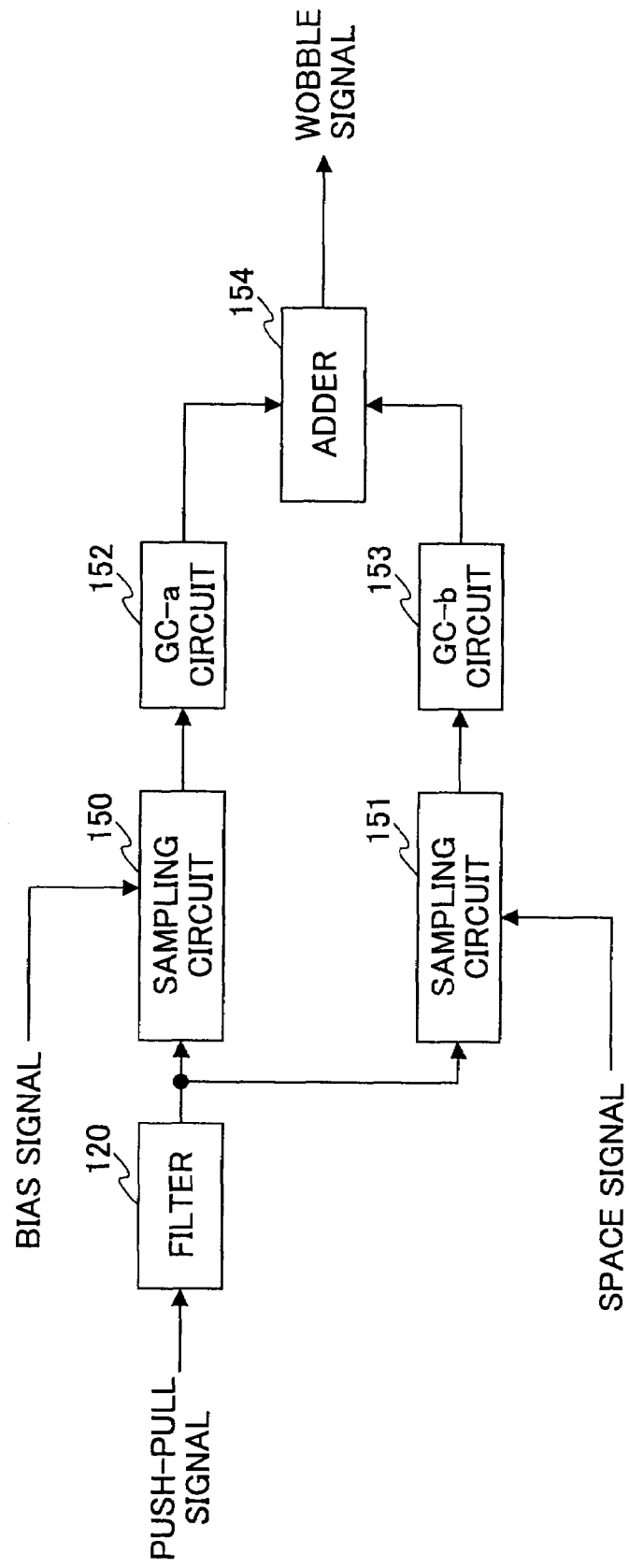
FIG. 15 is a block diagram showing a circuit configuration for performing a fifth wobble signal detection process in multilevel recording.

FIG. 15 is a block diagram showing a circuit configuration for performing the fifth wobble signal detection process in multilevel recording.

In this circuit configuration, the wobble signal is obtained by sampling the push-pull signal during the bias pulse period and the space pulse period respectively and synthesizing the signals obtained for each of the pulse periods.

This circuit configuration shown in FIG. 15 includes the filter 120, sampling circuits 150 and 151, a gain control (GC-a) circuit 152, a gain control (GC-b) circuit 153, and an adder 154 in the wobble detection circuit 10 shown in FIG. 1.

Thus, the circuit configuration of FIG. 15 has the function of extracting the wobble signal by synthesizing a gain-controlled signal obtained by applying a designated gain to the signal resulting from removing the cell frequency components from the push-pull signal detected during the laser emission period of the bias pulse, and the signal obtained by removing the cell frequency components from the push-pull signal detected during the laser emission period of the space pulse.

In this circuit configuration, the cell frequency components are removed from the push-pull signal at the filter 120, and the sampling circuits 150 and 151 receive a bias signal indicating the bias pulse period and a space signal indicating the space pulse period, respectively. A sampling signal representing the bias signal and the space signal may be the bias pulse and the space pulse itself, or the signal may be processed by shifting the timing, changing the width, for example, in order to stabilize the push-pull signal.

Then, the signals sampled at their respective timings are amplified or attenuated at the GC-a circuit 152 or GC-b circuit 153, and the resulting signals are synthesized at the adder 154 so that the wobble signal can be extracted.

The GC-a circuit 152 and GC-b circuit 153 are implemented for the purpose of compensating the difference in gain between the wobble signal components obtained during the bias pulse period and the wobble signal components obtained during the space pulse period. It is noted that in the present embodiment the GC-a circuit 152 makes a change in the gain to even out the signal difference and, therefore, the GC-b circuit 153 may be omitted.

Further, the gain changing method of the GC-a circuit 152 may be realized by the circuit configuration including the D/A converter 131 and VCA circuit 132 used in performing the second wobble signal detection process in multilevel recording. Alternatively, the gain changing method may be realized through selection of a plurality of resistance values.

Additionally, the adder 154 used in the present embodiment may be replaced by a selector. In FIG. 15, the sampling circuits 150 and 151 are implemented after the filter 120; however, the order of these circuits is irrelevant and the sampling circuits may also come before the filter. In this case, two filters are respectively implemented after the two sampling circuits.

In this embodiment, since the signal during the bias pulse period in which the light intensity is weak and the wobble signal components are small is amplified to a level equaling the signal level of the space pulse period, the signal components of the low output bias pulse period may be effectively used so that a wobble signal with high quality can be detected.

In the following, a sixth wobble signal detection process in multilevel recording is described.

In a circuit configuration for performing the sixth wobble signal detection process in multilevel recording, the wobble signal components detected during the respective pulse periods are amplified or attenuated using the respective gains for maintaining the respective levels of the sampled sum signals obtained during the bias pulse period and the space pulse period to a predetermined level.

This circuit configuration (not shown) corresponds to the circuit configuration shown in FIG. 15 but with the GC-a circuit 152 and GC-b circuit 153 having internal structures corresponding to the internal structure of the GC circuit 121" shown in FIG. 14.

Thus, the circuit configuration has the function of extracting the wobble signal by synthesizing: a first signal resulting from amplifying or attenuating the signal obtained by removing the cell frequency components from the push-pull signal acquired during the laser emission period of the bias pulse using a gain equivalent to the gain for maintaining the level of the sum signal detected during the laser emission period of the bias pulse to a pre-designated reference voltage, and a second signal resulting from amplifying or attenuating the signal obtained by removing the cell frequency components from the push-pull signal acquired during the laser emission period of the space pulse using a gain equivalent to the gain for maintaining the level of the sum signal detected during the laser emission period of the space pulse to a pre-designated reference voltage.

In the circuit configuration for performing the sixth wobble signal detection process in multilevel recording, the bias pulse period is set to be the sampling timing for the GC-a circuit 152, and the space pulse period is set to be the sampling timing for the GC-b circuit 153. The sampling signal indicating the sampling timing may be the corresponding pulse itself or a processed version of the pulse. Also, it is noted that the reference voltages for the respective signals are set equal.

In this way, the gain is successively changed for optimization in response to the fluctuation in the laser emission intensity or the change in the reflectivity of the media track during the recording of multilevel recording information having a periodic cycle, and the signal components of the low output bias pulse period are efficiently used by amplifying the signal during the bias pulse period (in which the light intensity is weak and wobble signal components are small) to a level equivalent to the signal level during the space pulse period so that a wobble signal with high quality can be optimally detected.

In the following a seventh wobble signal detection process in multilevel recording will be described.

Figure 16:
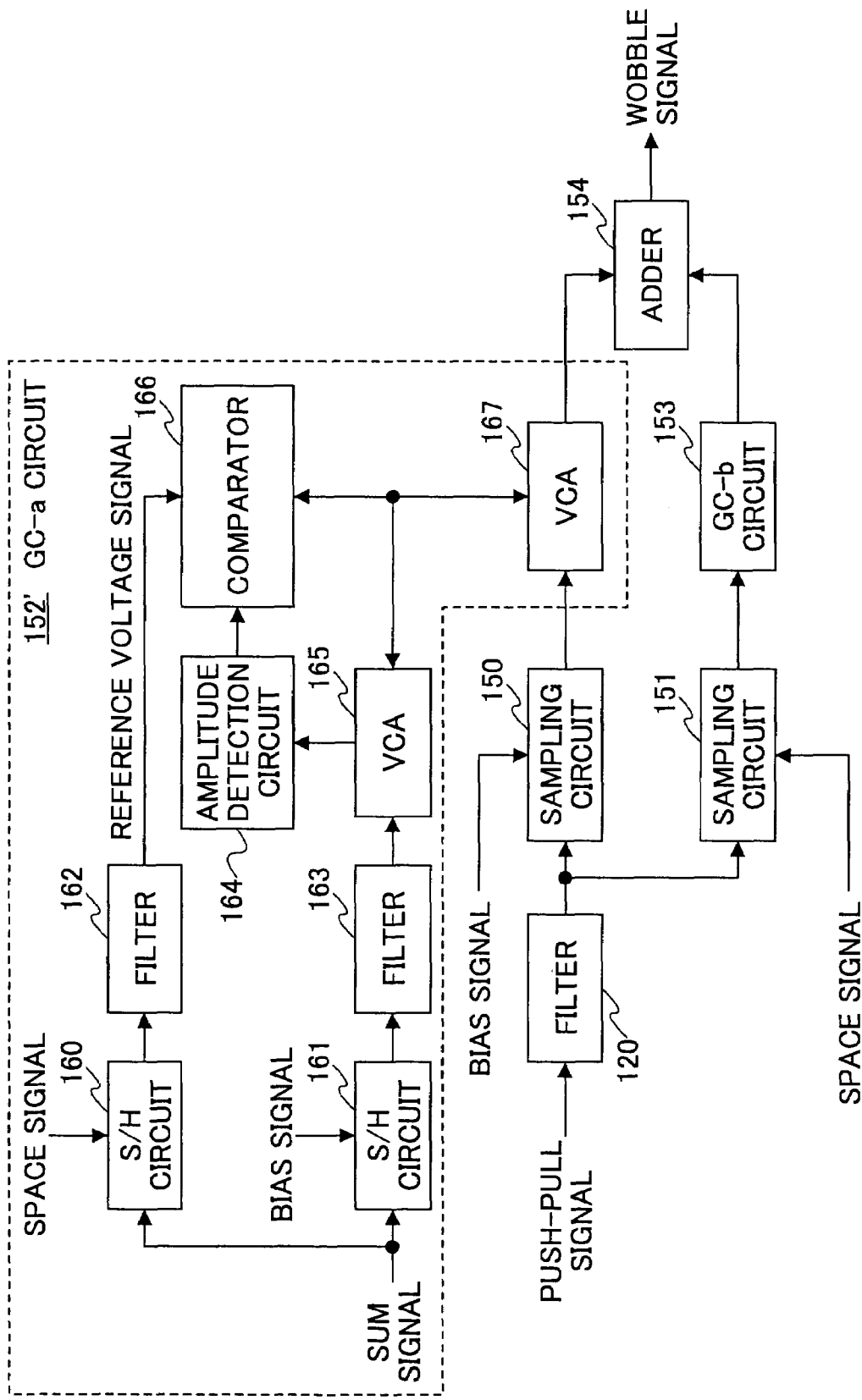
FIG. 16 is a block diagram showing a circuit configuration for performing a seventh wobble signal detection process in multilevel recording.

FIG. 16 is a block diagram showing a circuit configuration for performing the seventh wobble signal detection process in multilevel recording. It is noted that the component parts shown in FIG. 16 that are identical to those of FIG. 15 are given the same numerical notations.

This circuit configuration is mostly identical to the configuration shown in FIG. 15 except for the internal makeup of the GC-a circuit 152. A GC-a circuit 152' of FIG. 16 uses the level of the sum signal acquired during the space pulse period as the reference voltage.

Thus, the circuit shown in FIG. 16 has the function of extracting the wobble signal by synthesizing: a first signal resulting from amplifying or attenuating the signal obtained by removing the cell frequency components from the push-pull signal detected during the laser emission period of the bias pulse using a gain equivalent to the gain for maintaining the level of the sum signal detected during the laser emission period of the bias pulse to the level of the sum signal detected during the laser emission period of the space pulse, and a second signal obtained by removing the cell frequency components from the push-pull signal detected during the laser emission period of the space pulse.

In this circuit, the wobble signal detection process during the bias pulse period is identical to that performed in the circuit of FIG. 15; however, the reference voltage for the GC-a circuit 152' is obtained according to the following processes.

First, a S/H circuit 160 acquires the sum signal at a timing corresponding to the space signal indicating the space pulse period. Then, a smoothing process is performed on the sum signal at a filter 162 in which high frequency components above the wobble frequency are removed and the reference voltage is obtained. The reference voltage is then sent to a comparator 166.

Also, a S/H circuit 161 acquires (samples) the sum signal at a timing corresponding to the bias pulse signal indicating the bias pulse period. Then, high frequency components above the wobble frequency are removed from the sum signal at a filter 163 and the output signal from the filter 163 is amplified or attenuated at a voltage gain control amp (VCA) 165. Then, an amplitude detection circuit 164 detects the amplitude of the output signal from the VCA 165. Also, the comparator 166 compares the output signal from the VCA 165 with the reference voltage signal and outputs a voltage in accordance with the voltage difference obtained from the comparison so as to change the gain of a VCA 167.

In this embodiment, since the wobble signal gain for the space pulse period is fixed, the GC-b circuit 153 determining this gain can be omitted, and the circuit configuration can be simplified.

Thus, according to the present embodiment, the gain is iteratively changed for optimization in response to factors such as the fluctuation in the laser emission intensity or the change in the reflectivity of the medium track during recording of multilevel recording information having a periodic cycle, and the signal components of a low output bias pulse period are effectively used by amplifying the signal level in the bias pulse period having weak light intensity and small wobble signal components to be equal to the signal level in the space pulse period so that the circuit for detecting the wobble signal can be simplified and a wobble signal with high quality can be accurately detected.

In the following, the optical disk 13, which is an optical information recording medium according to an embodiment of the present invention will be described.

The optical disk 13 prescribes the wobble signal frequency suitable for multilevel information recording to be no more than $\frac{1}{10}$ the cell frequency, for example.

In bi-level recording, information is represented by the length of the recorded mark and, therefore, marks of sizes 3T~11T (T being the base period) occur randomly. In such an arrangement, the data band is wide and there is no strong output of particular frequency components.

However, in multilevel recording, the period of each mark corresponds to its cell and thus, a strong output of the cell frequency components occurs during recording, and a strong output of the frequency components of half the cell frequency occurs during playback.

The frequency components of a continuous set of multilevel information can be controlled to a certain degree through restricting the multilevel modulation control as explained earlier. Specifically, for example, when the multilevel value is denoted as "n", and the cell period of the multilevel information to be regulated is denoted as "m", an information amount of n to the $m^{th}$ power ($n^m$) is managed and from each set of "m" cells a combination having large frequency components (continuous pattern of multilevel information) is eliminated.

Taking this into account in restricting the multilevel information modulation, the managing of frequency components significantly lower than the cell frequency necessitates a wide band of management information.

On the other hand, the closer the frequency components are to the cell frequency, the higher the information density, thereby causing a decrease in the modulation efficiency and, in turn, a decrease in the recording capacity. Thus, specific values are given below as examples.

Based on the values of the CD and DVD, the wobble signal amplitude is approximately $\frac{1}{20}$ the maximum amplitude of the playback signal.

Figure 17:
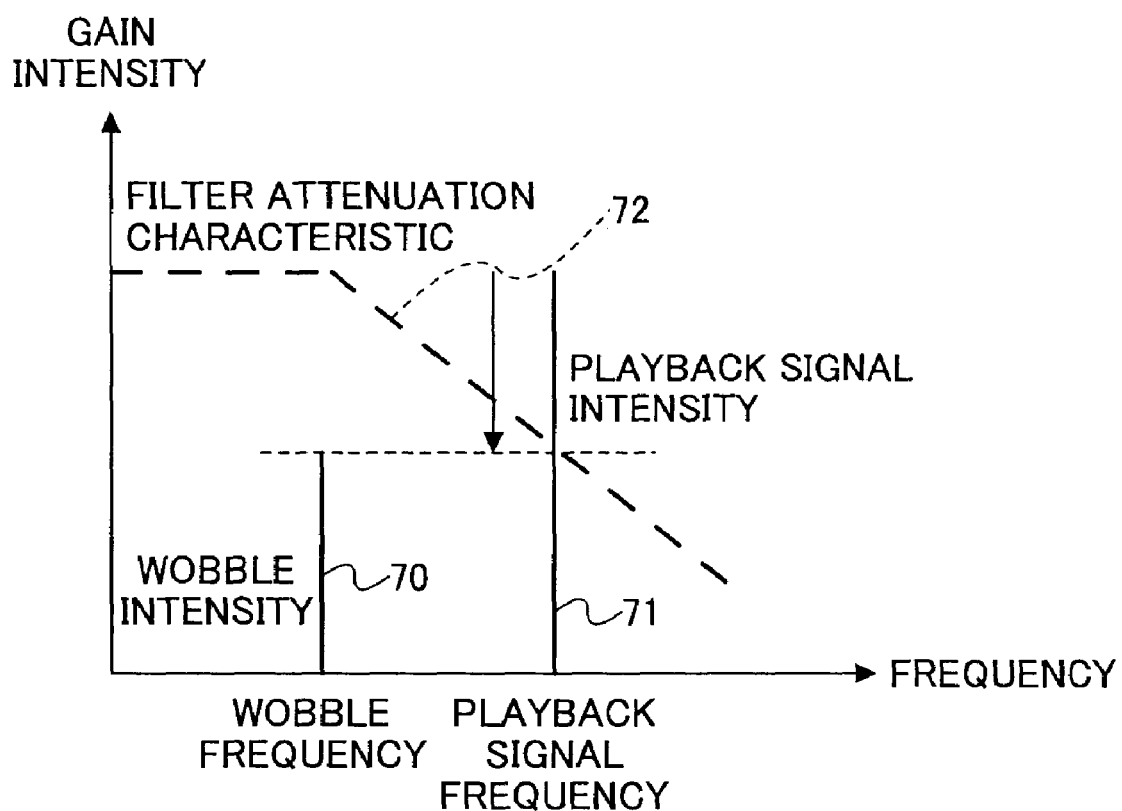
FIG. 17 is a graph illustrating the characteristics of an optical disk according to an embodiment of the present invention.

FIG. 17 is a graph illustrating the characteristics of the optical disk 13 according to an embodiment of the present invention.

In this graph, a bold line 70 at the wobble frequency represents the signal intensity of the wobble frequency components, and the bold line 71 at the playback signal frequency represents the playback signal intensity.

When the ratio 1 to 20 is set in the LOG display, although the overlapping point of the playback signal, which corresponds to the limit for extracting the wobble signal, depends on the frequency of the playback signal, the overlapping point is equal to or below the wobble signal amplitude.

Further, a secondary filter is preferably implemented in the circuit and, thus, a frequency for attenuating the playback signal by 1/20 or less may be obtained, for example, and the playback signal frequency may be set to five times the wobble frequency or greater, for example.

The filtering characteristic represented by the dotted line 72 has the function of removing frequency components above the wobble frequency, and as is shown in the drawing, the attenuation characteristic is enhanced as the signal frequency increases. Herein, the playback signal frequency is preferably set to a frequency having the attenuation rate at 1/20 or less.

Since the strongest playback signal frequency corresponds to half the cell frequency (since one period corresponds to two cells), the cell frequency is ten times greater than the wobble frequency; that is, the wobble frequency is preferably below 1/10 of the cell frequency.

In this way, the wobble signal can be separated from the cell frequency components on which various signals are strongly superposed during recording so that excellent signal quality can be obtained.

Also, by recording multilevel information on the optical disk 13 using the optical disk apparatus of the present embodiment, the recording system can be stabilized.

Further, by replaying the multilevel information recorded on the optical disk 13 with the optical disk apparatus of the present embodiment, the playback system can be stabilized.

In the following, servo signal detection processes in multilevel recording according to preferred embodiments of the present invention are described.

Figure 18:
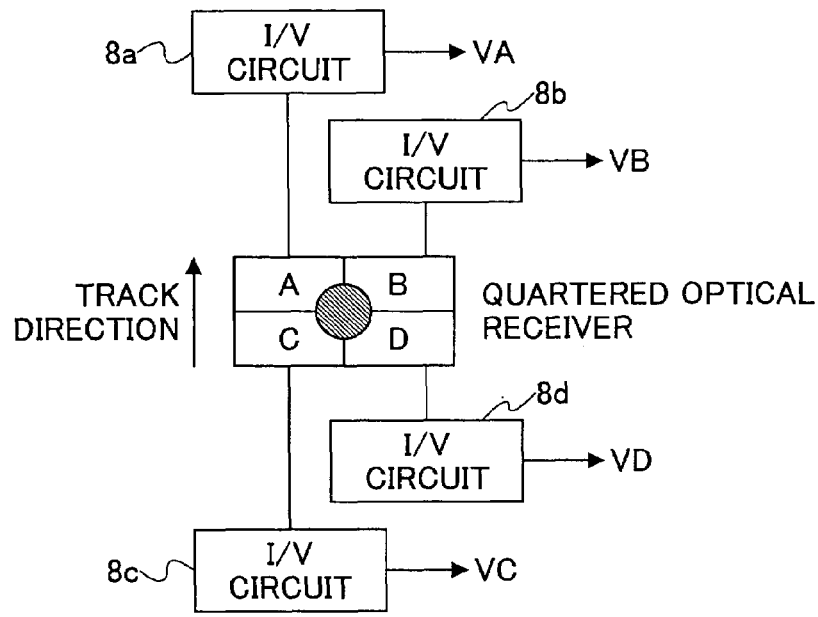
FIG. 18 is a block diagram showing a circuit configuration of a quartered optical receiver.
Figure 19:
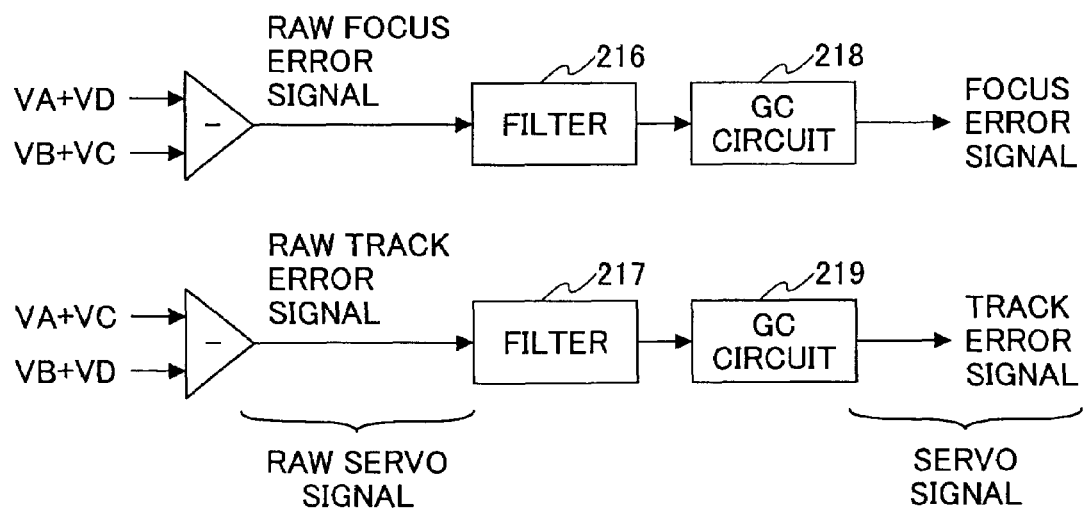
FIG. 19 is a block diagram showing a circuit configuration for performing a first servo signal detection process in multilevel recording.

FIG. 18 is a block diagram of a quartered optical receiver; and FIG. 19 is a block diagram of a circuit configuration for realizing a first servo signal detection process in multilevel recording according to an embodiment of the present invention.

As an example of a circuit configuration for realizing the first servo signal detection process in multilevel recording, the optical receiver (PD) 5 that receives reflected light from the optical disk 15 may be divided into four parts as shown in FIG. 18. Herein, the divided optical receiver parts 5A-5D send their outputs to I/V circuits 8a~8d, respectively. The I/V circuits 8a~8d perform voltage conversion on the reflection signals to produce signals VA~VD, respectively.

A raw focus error signal corresponds to (VA+VD)−(VB+VC), and a raw track error signal corresponds to (VA+VC)−(VB+VD). The raw focus error signal and the raw track error signal are obtained merely through computation and are not yet processed; thus, these signals are referred to as raw servo signals. The raw servo signal includes high frequency components such as wobble signal components, if the read area is unrecorded, and data signal components (cell frequency components), if the area is already recorded. Thereby, as is shown in FIG. 19, filters 216 and 217 for removing the high frequency components are implemented so that unnecessary noise can be cut off.

Then, the filtered signals are amplified or attenuated by gain control (GC) circuits 218 and 219 arranged for obtaining desired signal amplitudes so that servo signals such as the focus error signal and the track error signal are produced.

Herein, it is noted that the computation methods for the raw focus error signal and the raw track error signal may vary depending on the optical receiving system, and thus the computation method is not limited to the above example. Also, although not shown, other types of servo signals such as a track cross signal obtained by (VA+VB+VC+VD) can be detected according to identical processes.

In other words, the filters 216 and 217 have the function of removing high frequency components such as wobble signal components or cell frequency components from the raw servo signal detected from the optical information recording medium. The GC circuits 218 and 219 have the function of extracting a servo signal from the signal obtained from removing the high frequency components from the raw servo signal.

However, during recording, the intensity of the laser output is modulated and thus, the quality of the servo signal may be degraded.

Particularly, with recording laser emission without the bias pulse, an effective detection period cannot be secured when large recording marks succeed one after the other. On the other hand, with recording laser emission including the bias pulse, effective detection of signals can be performed during the bias pulse period.

Since the servo signal is a difference signal, ideally the laser intensity modulation components only influence the amplitude change of the servo signal components.

However, in reality, a variation in the axes of the lens and the rays or a variation in intensities between the four-part divided optical receiver parts due to a slanting of the medium may occur, for example, and thus, the intensity modulation components of the laser are superposed on the servo signal resulting in a degradation of the servo signals.

In the following, the above problem is described in further detail by referring back to FIGS. 11A-11D in which a case of successively recording marks of a uniform size on consecutive cells is illustrated.

As explained earlier, when a difference in intensities occurs within the quartered optical receiver due to some kind of fluctuation, the reflection signal during recording remains in the raw servo signal to thereby become noise to the servo signal components.

In other words, in multilevel recording, the cell frequency components are prone to being strongly superposed, and thus, in the circuit configuration for performing the first servo signal detection process in multilevel recording, filters 216 and 217 are inserted to remove the cell frequency components.

Also, depending on the format of the optical disk (recording medium) 13, a wobble signal for controlling the rotational speed of the medium obtained from the track formed on the medium may be superposed to become noise. In this case, these components are removed as well.

Further, in a system arranged for high speed recording, the reflection signal also receives influence from the write pulse and off pulse, and thereby a filtering characteristic that is able to remove components of higher frequency than the cell frequency is preferred. That is, the filter is preferably a low pass filter that cuts frequency components above the minimum wobble signal frequency. Also, GC circuits 218 and 219 are implemented to perform gain compensation on the outputs of the filters 216 and 217 so that the amplitude of the servo signal is suitably adjusted.

In this way, the high frequency components corresponding to the wobble signal of the cell frequency components are removed so that the degradation of the servo signal with a short valid signal period obtained from the laser emission for multilevel information recording can be prevented, and a servo signal of high quality can be detected.

Next, a second servo signal detection process in multilevel recording will be described.

Figure 20:
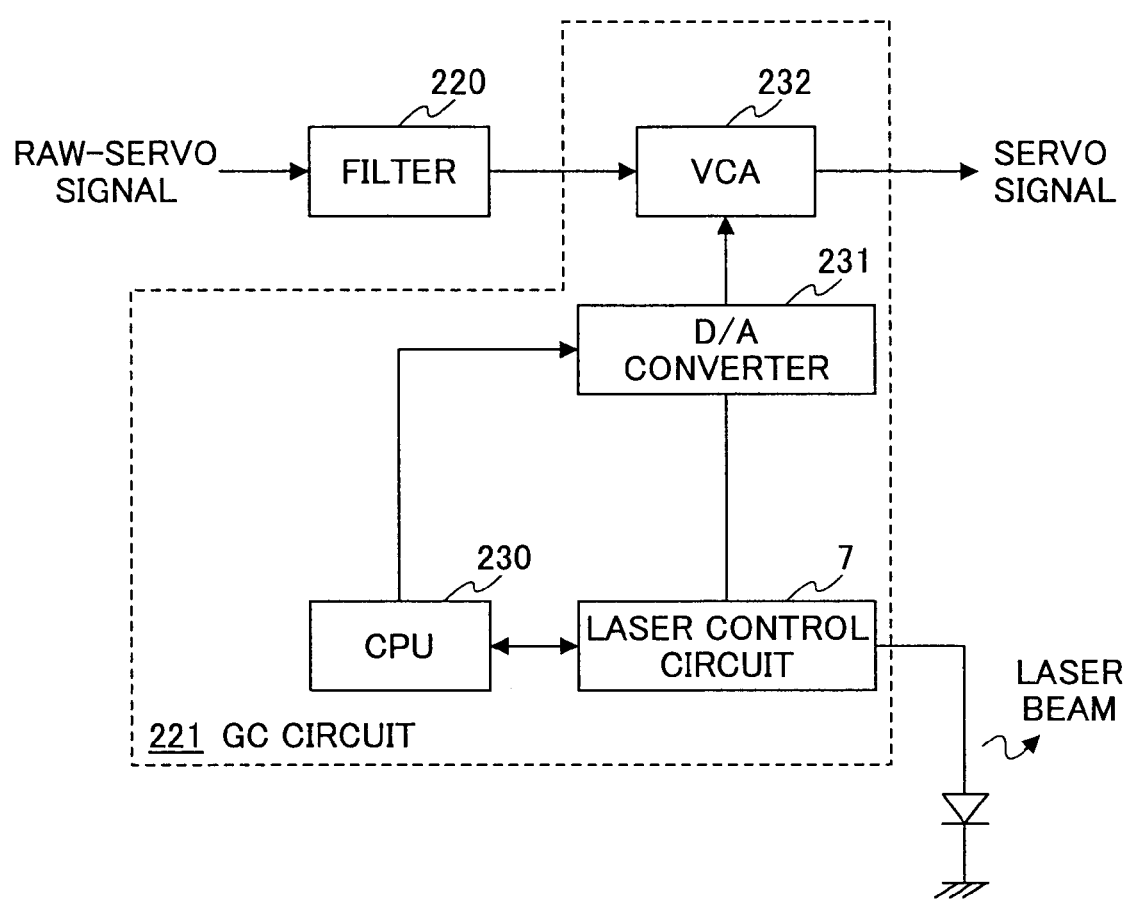
FIG. 20 is a block diagram showing a circuit configuration for performing a second servo signal detection process in multilevel recording.

FIG. 20 is a block diagram showing a circuit configuration for performing the second servo signal detection process in multilevel recording.

In the circuit configuration performing the second servo signal detection process in multilevel recording, servo signals of a certain signal quality level can be detected with a simple circuit configuration.

Generally, the laser emission intensity is optimized by conducting test-writing before recording user data so that high quality multilevel information may be recorded. Herein, it is preferable that the optimum gain of the wobble signal changes as the light intensity of the laser rays changes.

The circuit configuration performing the second servo signal detection process as shown in FIG. 20 includes a filter 220 and a gain control (GC) circuit 221 as the laser control circuit 7 and the servo detection circuit 11 shown in FIG. 1.

Further, the GC circuit 221 includes the laser control circuit 7, a CPU 230, a D/A converter 231, and a VCA 232.

That is, the GC circuit 221 shown in FIG. 20 has the function of extracting a servo signal using at least a setting value calculated based on the light intensity of the bias pulse and the light intensity of the space pulse for determining a gain to be applied to the signal obtained from removing high frequency components of the wobble signal or cell frequency components from the raw servo signal.

In the GC circuit 221, the light intensity of the laser emission is managed by the CPU 230, that is, the CPU 230 sets the optimum light intensity value to the laser control circuit 7. Alternatively, the laser control circuit 7 itself may be arranged to read the current light intensity setting.

Based on the light intensity setting, the CPU 230 calculates the average laser emission amount obtained through imaginary smoothing of the light intensity modulation components, and sets the appropriate value to the D/A converter 231 to determine the gain of the VCA 232.

The gain of the VCA 232 changes according to the output voltage of the D/A converter 231. The average laser emission amount can be obtained based on the pulse width of each pulse managed by the CPU 230, the light intensity, and the generation rate of multilevel information.

Accordingly, the gain is changed to an optimal value in response to the successive change in the recording light intensity for the purpose of securing recording quality with a simple circuit configuration, and an appropriate servo signal detection process can be performed.

In the following, a third servo signal detection process in multilevel recording will be described.

Figure 21:
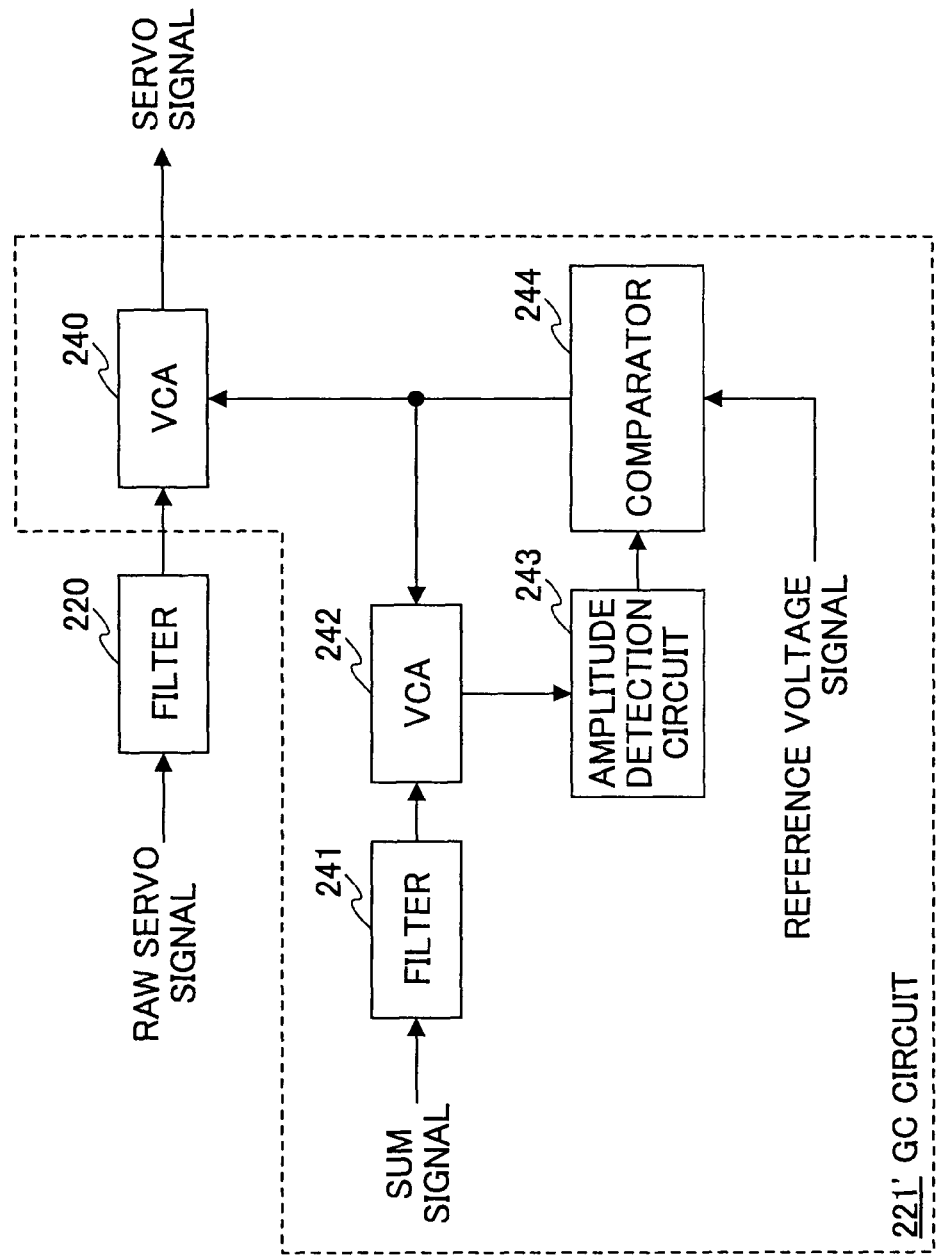
FIG. 21 is a block diagram showing a circuit configuration for performing a third servo signal detection process in multilevel recording.

FIG. 21 is a block diagram showing a circuit configuration for performing the third servo signal detection process in multilevel recording.

This circuit configuration is for realizing a stable servo detection process in conjunction with the changing of the average of the reflection signal (sum signal) during recording.

The sum signal changes at a low frequency due to a variation in the reflectivity of the medium surface or medium track or a fluctuation in the laser intensity (lower in frequency than the modulation components of each pulse). Further, the sum signal changes depending on the continuity of the multilevel information. These fluctuations in a wide band influence the servo signal as factors for changing the gain.

Thus, by implementing the circuit for performing the third servo signal detection process in multilevel recording, the above described problem may be prevented.

This circuit configuration shown in FIG. 21 includes the filter 220 and a gain control (GC) circuit 221' as the servo detection circuit 11 shown in FIG. 1.

The GC circuit 221' includes a VCA 240, a filter 241, a VCA 242, an amplitude detection circuit 243, and a comparator 244.

That is, the GC circuit 221' shown in FIG. 21 has the function of extracting a servo signal by amplifying or attenuating the signal obtained by removing the high frequency components corresponding to the wobble signal or cell frequency from the raw servo signal using a gain that is equivalent to a gain for maintaining the level of a signal obtained by removing the high frequency components from the sum signal to a pre-designated reference voltage.

In this circuit, the high frequency components are removed from the sum signal at the filter 241, and the output signal from the filter 241 is amplified or attenuated at the voltage gain control amplifier (VCA) 242. Then, at the amplitude detection circuit 243, the amplitude of the output signal from the VCA 242 is detected, and the output signal from the VCA 242 is compared with a pre-designated reference voltage signal at the comparator 244. A voltage corresponding to the difference obtained from the comparison is output so that the gain of the VCA 242 is changed.

Owing to this loop, the gain of the VCA 242 is controlled so that the output signal amplitude of the VCA 242 reaches the pre-designated reference voltage. As for the raw servo signal, high frequency components such as cell frequency components and wobble signals (wobble frequency components) are removed at the filter 220 after which the filtered signal is amplified or attenuated by the VCA 240. The gain of the VCA 240 is equal to the gain of VCA 242.

Thus, by successively changing the gain in response to the laser emission intensity fluctuation in the recording of multilevel recording information with a periodic cycle or the fluctuation in the reflectivity of the media track to optimize the gain, an optimum servo signal detection may be realized.

In the following, a fourth servo detection process in multilevel recording will be described.

Figure 22:
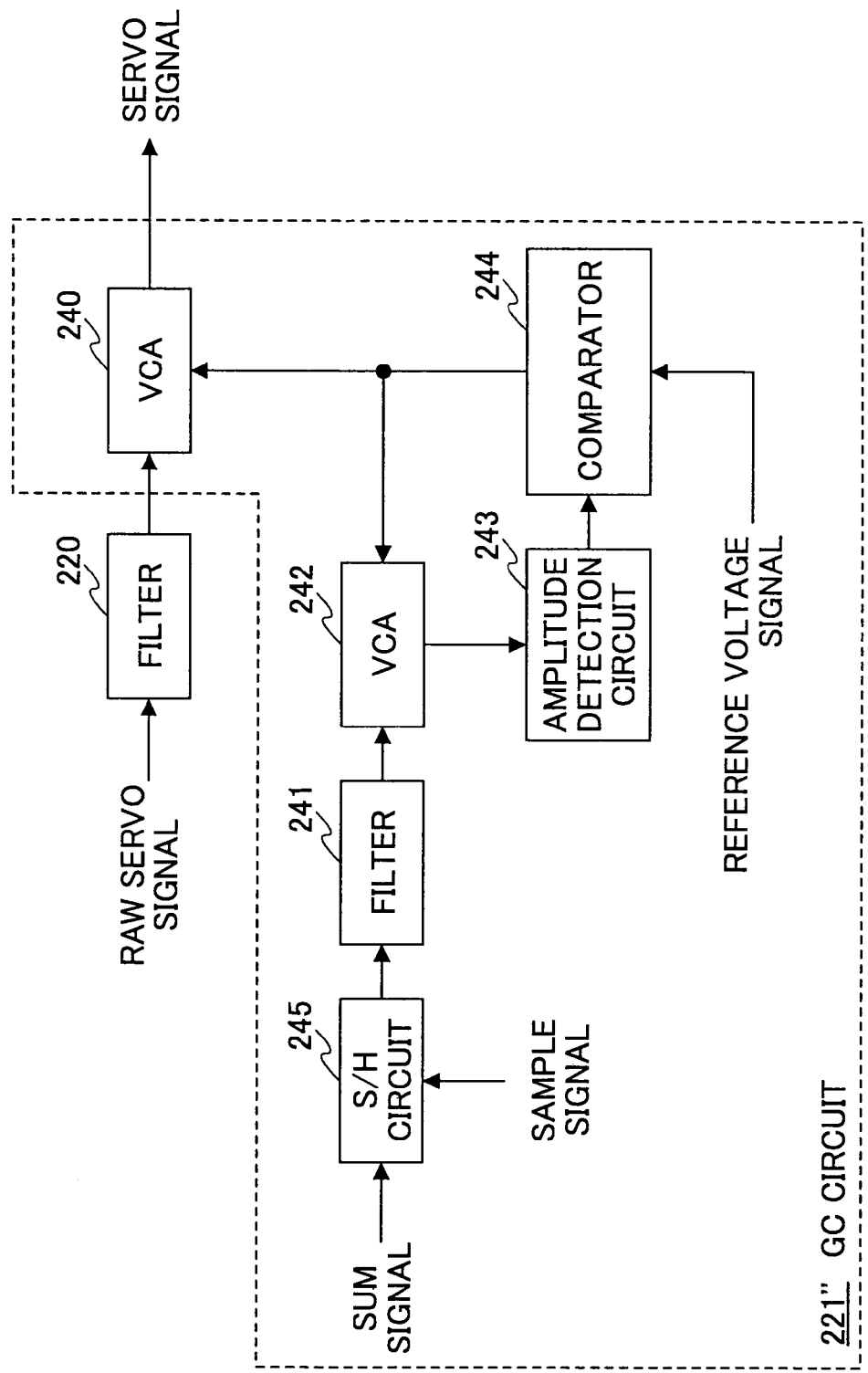
FIG. 22 is a block diagram showing a circuit configuration for performing a fourth servo signal detection process in multilevel recording.

FIG. 22 is a block diagram showing a circuit configuration for performing the fourth servo signal detection process in multilevel recording. It is noted that the parts that correspond to those shown in FIG. 21 are given the same numerical notations.

This circuit configuration is very similar to the circuit configuration for performing the third servo signal detection process in multilevel recording; however, the circuit configuration in FIG. 22 further implements a sample hold (S/H) circuit 245 before the filter 241, and the sample signal obtained during a sampling process in the bias pulse period or the space pulse period is used as the base signal rather than using the average of the sum signal.

Thus, the GC circuit 221" shown in FIG. 22 has the function of extracting a servo signal by amplifying or attenuating the signal obtained from removing high frequency components such as wobble signal or cell frequency components from the raw servo signal using a gain equal to the gain for maintaining the level of a sum signal obtained during a laser emission period of the bias pulse or the laser emission period of the space pulse to a pre-designated reference voltage.

Since the circuit configuration for performing the fourth servo signal detection process in multilevel recording is mostly identical to that for performing the third servo signal detection process, differing features of the latter configuration, namely, the S/H circuit 245 and the signal input to the filter 241 will be described.

As described above, the sum signal includes fluctuation relating to the continuity of the multilevel information. For example, when multilevel information of ten consecutive cells is: "0, 0, 0, 0, 0, 4, 4, 4, 4, 4", the sum signal includes a fluctuation having frequency components of $1/10$ the cell frequency. Ideally, in order to separate the frequencies, the modulation pattern is controlled at the stage of multilevel modulation so that the fluctuation of the sum signal is prevented from being around the servo signal frequency. The modulation pattern control involves eliminating the use of a particular pattern after increasing the information amount by attaching redundant bits.

This in turn means that the recording density is reduced and thereby the advantage of achieving higher density in the multilevel recording method is diminished. Further, unlike the bi-level recording, in multilevel recording, a complete separation of the frequencies through modulation pattern control may be difficult.

For example, when the multilevel information is: "0, 1, 0, 1, 0, 7, 6, 7, 6, 7", although there is no continuity in the multilevel information, frequency components of 1/10 the cell frequency do exist in the signal as in the previous pattern with "0"s and "4"s. In order to completely eliminate a desired frequency, a significant amount of redundant bits needs to be attached and many patterns need to be eliminated.

Realistically, it is impossible to completely remove the sum signal fluctuation of the servo band, and some fluctuation is expected to remain in the signal.

When fluctuation close to the servo band is superposed on the sum signal, the gain compensation performed on the servo signal by the VCA 240 may do more harm than good depending on the band (phase delay) of the control loop including the VCA 242.

For example, if there is a fluctuation of 1/10 the cell frequency in the sum signal and the servo signal and if the phase delay of the control loop including the VCA 242 is 1/5 the cell frequency, the gain compensation of the VCA 242 and the VCA 240 will have inverse phases of the input so that when the amplitude of the input such as the sum signal or the servo signal is large, the output is amplified and when the amplitude of the input is small, the output is attenuated.

In reality, since high frequency components are removed at the filter 241, the adverse effect of the gain compensation will not be as obvious as the above-described example; however, the same effect may occur with frequencies lower than the wobble frequency.

In order to avoid being misguided by the fluctuation of the sum signal due to the continuity of the multilevel information, the S/H circuit 245 obtains the sum signal during the bias pulse period or the space pulse period through sampling. Further, in order to improve the signal quality, the sampling may be limited to the recording timing of predetermined multilevel information.

For example, when recording the level "0", the space pulse is long, and when recording the level "7", the bias pulse is long. Thus, sampling errors due to the "corruption" of the signal can be reduced when sampling the above signal levels during the respective pulse periods.

Then the output signal of the S/H circuit 245 is filtered at the filter 241 so that high frequency components are removed as described above and sampling noise is removed as well.

Thus, the gain is successively changed for optimization in response to the fluctuation in the reflectivity of the medium track so that optimal servo signal detection can be performed.

In the following, a fifth servo signal detection process in multilevel recording will be described.

Figure 23:
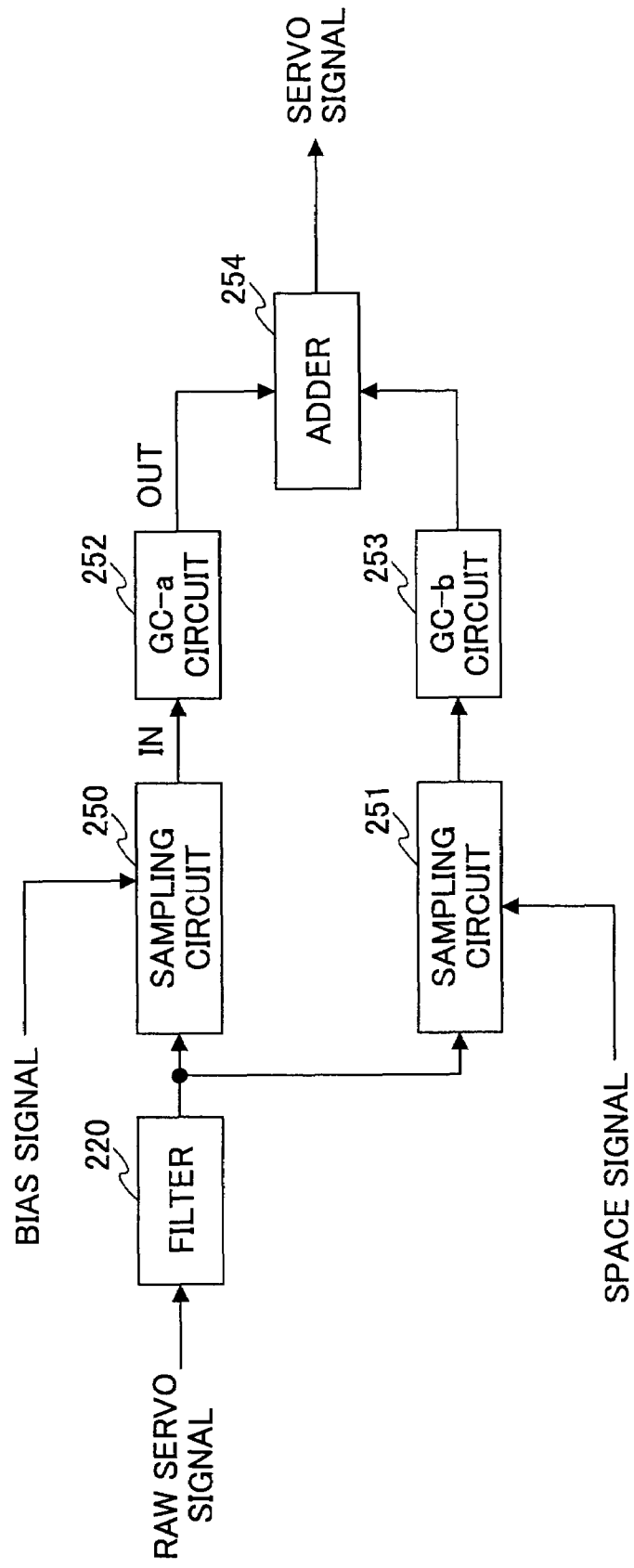
FIG. 23 is a block diagram showing a circuit configuration for performing a fifth servo signal detection process in multilevel recording.

FIG. 23 is a block diagram showing a circuit configuration for performing the fifth servo signal detection process in multilevel recording.

In this circuit configuration, the servo signal is obtained by sampling raw servo signals during the bias pulse period and the space pulse period respectively and synthesizing the signals obtained for each of the pulse periods.

This circuit configuration shown in FIG. 23 includes the filter 220, sampling circuits 250 and 251, a gain control (GC-a) circuit 252, a gain control (GC-b) circuit 253, and an adder 254 as the servo detection circuit 11 shown in FIG. 1.

Thus, the circuit configuration of FIG. 23 has the function of extracting the servo signal by synthesizing: a first signal resulting from applying a predetermined gain to the signal obtained by removing high frequency components corresponding to the wobble signal or cell frequency from the raw servo signal detected during the laser emission period of the bias pulse and, and a second signal obtained by removing high frequency components corresponding to the wobble signal or the cell frequency from the raw servo signal detected during the laser emission period of the space pulse.

In this circuit configuration, high frequency components of the wobble signal or the cell frequency components are removed from the raw servo signal at the filter 220, and each of the sampling circuits 250 and 251 receive a bias signal of the bias pulse period and a space signal of the space pulse period respectively. A sampling signal representing the bias signal and the space signal may be the bias pulse or the space pulse itself, or the signal may be processed by shifting the timing, changing the width, for example, in order to stabilize the raw servo signal.

Then, the signals sampled at their respective timings are amplified or attenuated at the GC-a circuit 252 or GC-b circuit 253, and the resulting signals are synthesized at the adder 254 so that the servo signal is extracted.

The GC-a circuit 252 and GC-b circuit 253 are implemented for the purpose of compensating the difference in gain between the servo signal components obtained during the bias pulse period and the servo signal components obtained during the space pulse period. It is noted that in the present embodiment the GC-a circuit 252 makes the change in the gain to smooth out the signal difference, and therefore, the GC-b circuit 253 may be omitted.

Also, the gain changing method of the GC-a circuit 252 may be realized by the circuit configuration shown in FIG. 20 including the D/A converter 231 and VCA circuit 232. Alternatively, the gain changing method may be realized by the selection of a plurality of resistance values.

Further, the adder 254 used in the present embodiment may be replaced by a selector. In FIG. 23, the sampling circuits 250 and 251 are implemented after the filter 220; however, the order of these circuits is irrelevant and the sampling circuits may come before the filter. In this case, two filter circuits are respectively implemented after the two sampling circuits.

In this embodiment, since the signal during the bias pulse period in which the light intensity is weak and the servo signal components are small is amplified to a level equaling the signal level of the space pulse period, the signal components of the low output bias pulse period may be effectively used so that a servo signal with high quality can be detected.

In the following, a sixth servo signal detection process in multilevel recording is described.

In a circuit configuration for performing the sixth servo signal detection process in multilevel recording, the servo signal components are also amplified or attenuated with the gain for maintaining the sum signal level obtained from the sampling of each of the bias pulse period and the space pulse period at a certain level.

This circuit configuration corresponds to the circuit configuration shown in FIG. 23 but with the GC-a circuit 252 and GC-b circuit 253 having internal structures corresponding to the internal structure of the GC circuit 221" shown in FIG. 22.

Thus, the circuit configuration has the function of extracting the servo signal by synthesizing: a first signal resulting from amplifying or attenuating the signal obtained by removing high frequency components corresponding to the wobble signal or cell frequency components from the raw servo signal detected during the laser emission period of the bias pulse using a gain equivalent to the gain for maintaining the level of the sum signal detected during the laser emission period of the bias pulse to a pre-designated reference voltage, and a second signal resulting from amplifying or attenuating the signal obtained by removing high frequency components corresponding to the wobble signal or cell frequency components from the raw servo signal detected during the laser emission period of the space pulse using a gain equivalent to the gain for maintaining the level of the sum signal detected during the laser emission period of the space pulse to a pre-designated reference voltage.

In the circuit configuration for performing the sixth servo signal detection process in multilevel recording, the bias pulse period is set to be the sampling timing for the GC-a circuit 252, and the space pulse period is set to be the sampling timing for the GC-b circuit 253. The sampling signal indicating the sampling timing may be the corresponding pulse itself or a processed version of the pulse. Also, it is noted that the reference voltages for the respective signals are set equal.

In this way, the gain is successively changed for optimization in response to the fluctuation in the laser emission intensity or the change in the reflectivity of the media track during the recording of multilevel recording information having a periodic cycle, and the signal components of the low output bias pulse period are efficiently used by amplifying the signal during the bias pulse period in which the light intensity is weak and wobble signal components are few to a level equivalent to the signal level during the space pulse period so that a servo signal with high quality can be appropriately detected.

In the following a seventh servo signal detection process in multilevel recording will be described.

Figure 24:
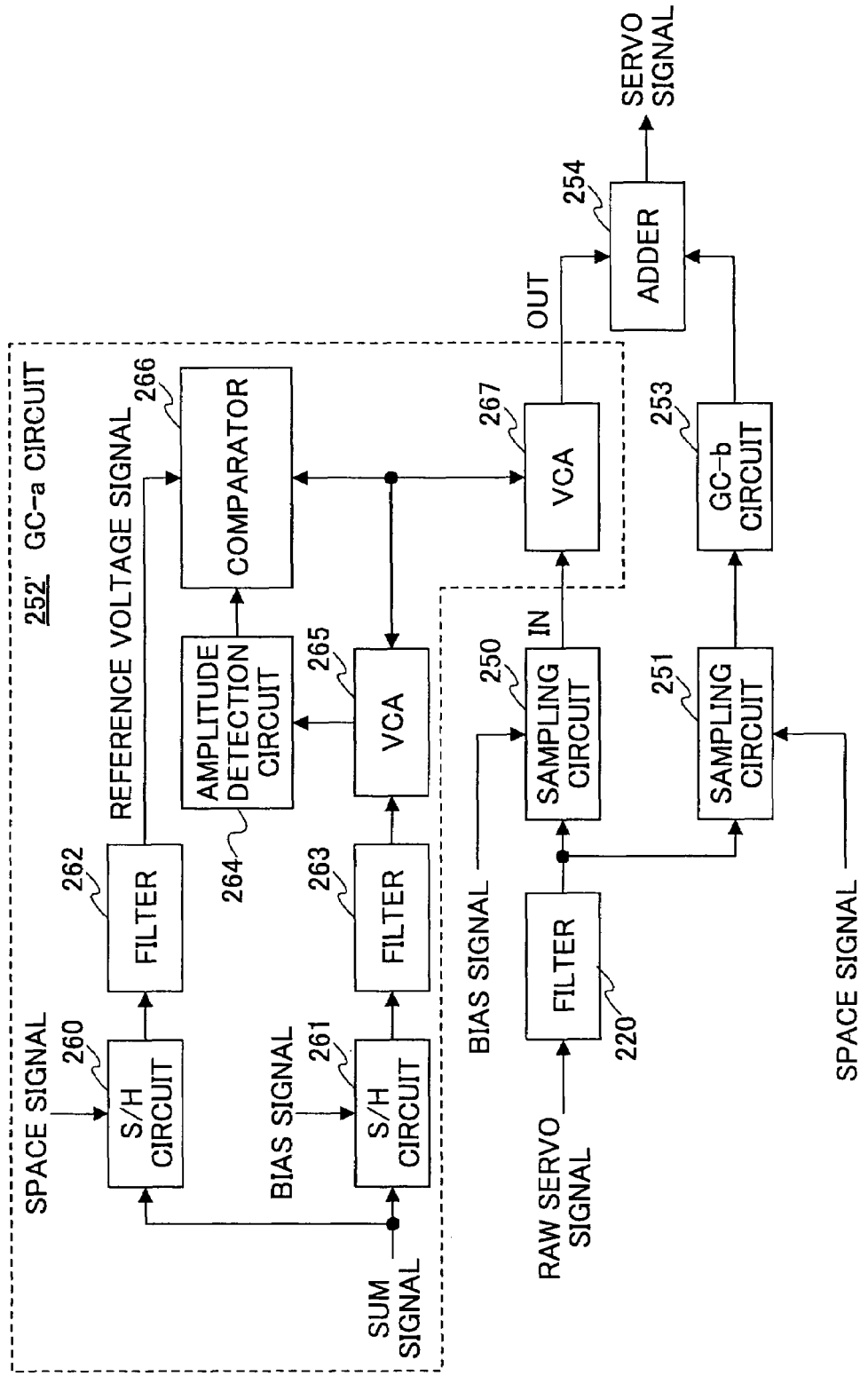
FIG. 24 is a block diagram showing a circuit configuration for performing a seventh servo signal detection process in multilevel recording.

FIG. 24 is a block diagram showing a circuit configuration for performing the seventh servo signal detection process in multilevel recording. It is noted that the component parts shown in FIG. 24 that are identical to those of FIG. 23 are given the same numerical notations.

This circuit configuration is mostly identical to the configuration shown in FIG. 23 except for the internal makeup of the GC-a circuit 252. The GC-a circuit 252' of FIG. 24 uses the level of the sum signal acquired during the space pulse period as the reference voltage for the GC-a circuit 252'.

Thus, the circuit shown in FIG. 24 has the function of extracting the servo signal by synthesizing: a first signal resulting from amplifying or attenuating the signal obtained by removing high frequency components corresponding to the wobble signal or cell frequency from the raw servo signal detected during the laser emission period of the bias pulse using a gain equivalent to the gain for maintaining the level of the sum signal detected during the laser emission period of the bias pulse to the level of the sum signal detected during the laser emission period of the space pulse, and a second signal obtained by removing high frequency components corresponding to the wobble signal or cell frequency from the raw servo signal detected during the laser emission period of the space pulse.

In this circuit, the servo signal detection process during the bias pulse period is identical to that performed in the circuit of FIG. 23; however, the reference voltage for the GC-a circuit 252' is obtained according to the following processes.

First, a S/H circuit 260 acquires the sum signal at a timing corresponding to the space signal indicating the space pulse period. Then a smoothing process is performed on the sum signal at a filter 262 so that high frequency components are removed and the reference voltage is obtained. The reference voltage is then sent to a comparator 266.

Also, a S/H circuit 261 acquires (samples) the sum signal at a timing corresponding to the bias pulse signal indicating the bias pulse period. Then high frequency components are removed from the sum signal at a filter 263 and the output signal from the filter 263 is amplified or attenuated at a voltage gain control amp (VCA) 265. Then, an amplitude detection circuit 264 detects the amplitude of the output signal from the VCA 265. Also, the comparator 266 compares the output signal from the VCA 265 with the reference voltage signal and outputs a voltage corresponding to the voltage difference obtained from the comparison so as to change the gain of a VCA 267.

In this embodiment, since the servo signal gain for the space pulse period is fixed, the GC-b circuit 253 determining this gain can be omitted, and the circuit configuration can be simplified.

Thus, according to the present embodiment, the circuit for detecting the servo signal can be simplified, in which circuit the gain is iteratively changed for optimization in response to factors such as the fluctuation in the laser emission intensity or the change in the reflectivity of the medium track during recording of multilevel recording information having a periodic cycle, and the signal components of a low output bias pulse period are effectively used by amplifying the signal level in the bias pulse period having weak light intensity and small servo signal components to be equal to the signal level in the space pulse period so that a servo signal with high quality can be accurately detected.

In the following, an eighth servo signal detection process in multilevel recording will be described.

Figure 25:
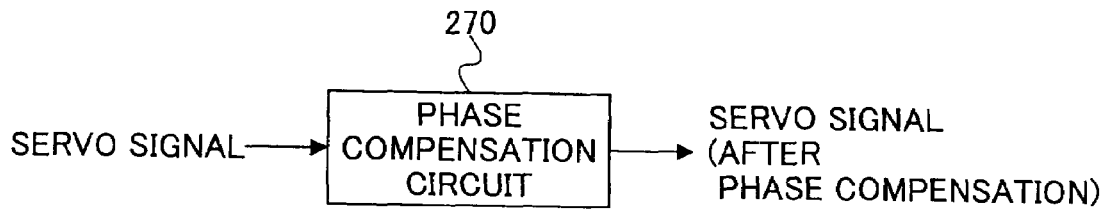
FIG. 25 is a block diagram showing a circuit configuration for performing an eighth servo signal detection process in multilevel recording.

FIG. 25 is a block diagram showing a circuit configuration for performing the eighth servo signal detection process in multilevel recording.

Figure 26A:
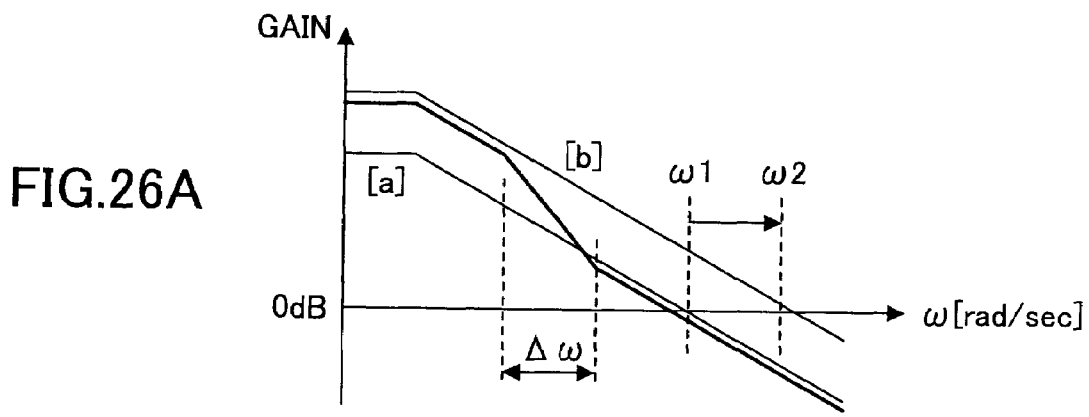
FIGS. 26A and 26B are diagrams illustrating the eighth servo signal detection process in multilevel recording.
Figure 26B:
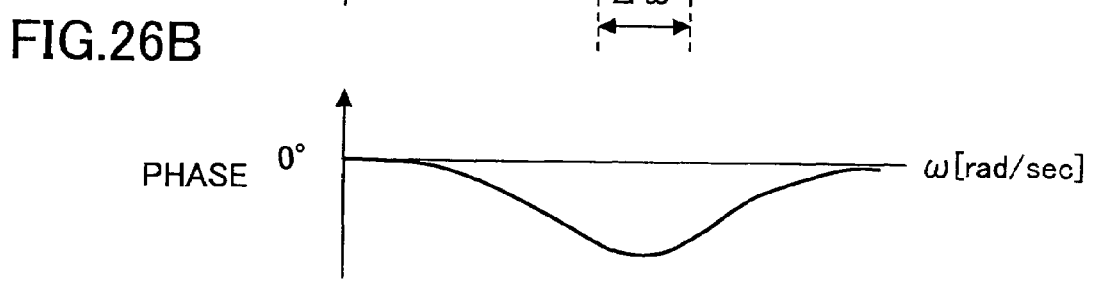

FIGS. 26A and 26B are graphs illustrating the eighth servo signal detection process in multilevel recording performed by the circuit shown in FIG. 25.

As is shown in FIG. 25, in this circuit configuration a phase compensation circuit 270 is implemented after the servo detection circuit 11 shown in FIG. 1 to perform phase compensation on the servo signal obtained according to any one of the first to seventh servo signal detection processes in accordance with the phase characteristic obtained in a closed loop that controls the position of the laser beam on the medium.

Thus, the phase compensation circuit 270 has the function of performing phase compensation on the servo signal obtained according to any one of the first to seventh servo signal detection processes in multilevel recording.

In laser beam position control, the cross frequency (frequency at which the closed loop gain characteristic is 0 dB) cannot be set very high owing to mechanical limitations.

In FIG. 26A, line [a] shows the simplest gain characteristic for the cross frequency to be $\omega 1$. On the other hand, in order to maintain control accuracy, the laser beam position control may be adapted for low band fluctuations such as medium rotation components and, therefore, the gain characteristic of the closed loop may be arranged to have a high gain in a lower band. A simple gain characteristic satisfying this condition is indicated by line [b] in FIG. 26A. However, in this case, the cross frequency is at a higher frequency of $\omega 2$, which is beyond the mechanical limitation.

The phase compensation circuit 270 may be used in such situations. FIG. 26B shows the independent characteristic of the phase compensation circuit 270. As shown in this drawing, the gain changes in the band $\Delta\omega$. When the gain changes, a phase delay occurs around this band $\Delta\omega$ but it is just in this area that the delay occurs.

By arranging the servo signal to pass through the phase compensation circuit 270 a high gain can be secured in a low band while the cross frequency is kept at $\omega 1$. In this embodiment, a phase delay circuit is given as an example of the phase compensation circuit 270; however, a phase lead circuit for securing a lead around the cross frequency may be used instead.

According to this embodiment, phase compensation is performed on the servo signal in order to control the laser beam position on the medium, and thereby a servo signal characteristic satisfying both the mechanical conditions and control accuracy requirements can be obtained.

Also, with the arrangement in which the above-described optical apparatus records multilevel information on the optical disk 15 and replays the multilevel information recorded on the optical disk 15, a stable recording playback system can be realized.

With the servo signal detection method in multilevel recording and optical information recording playback apparatus according to the present invention, a servo signal that is suitable for recording multilevel information with a write pulse, an off pulse, a space pulse and a bias pulse may be detected.

The present application is based on and claims the benefit of the earlier filing date of Japanese Patent Application No. 2002-25917 filed on Sep. 4, 2002, Japanese Patent Application No. 2002-346800 filed on Nov. 29, 2002, and Japanese Patent Application No. 2002-346820 filed on Nov. 29, 2002, the entire contents of which are hereby incorporated by reference.

What is claimed is:

1. A laser control circuit adapted to modulate a light intensity of a laser beam irradiated for recording multilevel information on an optical information recording medium, wherein an area of the optical information recording medium is divided into approximately uniform cells, and marks that can be formed in a plurality of sizes are recorded on the cells according to the multilevel information being recorded by adjusting a time width of a bias power period and an off power period of the laser beam, said laser control circuit comprising:

a unit that inputs a clock signal indicating a cell frequency and the multilevel information corresponding to each cell, and determines a laser beam emission waveform for each cell based on the input clock signal and multilevel information, wherein a period of an n-multiplied frequency (n being an integer) of the clock signal indicating the cell frequency is used as a step in setting the laser beam emission waveform, and wherein the time width of the bias power period is based on an equation:

$$Tb=(a-1)Tx+Ty,$$

where $Tb$ is the time width of the bias power period, $a$ is a multilevel value, $Tx$ is a unit of time width, and $Ty$ is a time width provided for each level of multilevel information.

* * * * *